US012465863B2

(12) United States Patent
Sato et al.

(10) Patent No.: US 12,465,863 B2
(45) Date of Patent: Nov. 11, 2025

(54) PROGRAM, ELECTRONIC DEVICE, METHOD, AND SYSTEM

(71) Applicant: CYGAMES, INC., Tokyo (JP)

(72) Inventors: Hironori Sato, Tokyo (JP); Yuki Tamura, Tokyo (JP); Shingo Ikeda, Tokyo (JP)

(73) Assignee: CYGAMES, INC., Tokyo (JP)

( * ) Notice: Subject to any disclaimer, the term of this patent is extended or adjusted under 35 U.S.C. 154(b) by 284 days.

(21) Appl. No.: 18/351,011

(22) Filed: Jul. 12, 2023

(65) Prior Publication Data

US 2023/0347252 A1 Nov. 2, 2023

Related U.S. Application Data

(63) Continuation of application No. PCT/JP2022/000629, filed on Jan. 12, 2022.

(30) Foreign Application Priority Data

Jan. 15, 2021 (JP) ................................ 2021-005106

(51) Int. Cl.
*A63F 13/822* (2014.01)
*A63F 13/335* (2014.01)

(52) U.S. Cl.
CPC .......... *A63F 13/822* (2014.09); *A63F 13/335* (2014.09)

(58) Field of Classification Search
None
See application file for complete search history.

(56) References Cited

U.S. PATENT DOCUMENTS

2023/0166191 A1* 6/2023 Akitsu .................. A63F 13/533 463/31
2023/0381657 A1* 11/2023 Akitsu .................... A63F 13/69
2025/0135353 A1* 5/2025 Narita ..................... A63F 13/63

FOREIGN PATENT DOCUMENTS

JP 2002-126349 A 5/2002
JP 2004-105308 A 4/2004
(Continued)

OTHER PUBLICATIONS

International Search Report issued in corresponding International Application No. PCT/JP2022/000629, mailed on Mar. 22, 2022 (5 pages).
(Continued)

*Primary Examiner* — Ronald Laneau
(74) *Attorney, Agent, or Firm* — Osha Bergman Watanabe & Burton LLP

(57) ABSTRACT

An electronic device has a raising-game execution unit for executing a raising game in a turn constituting the raising game on the basis of a raising command choice selected by a player, changing a parameter associated with a raising game medium, and advancing the turn. The raising-game execution unit has a first-game execution unit for executing a first game in the case where the selected raising command choice is related to the first game and a goal-achievement-condition decision unit for deciding, on the basis of a result of execution of the first game, whether or not a goal achievement condition has been achieved in the case where the first game and the goal achievement condition are associated, and the first-process execution unit changes a parameter associated with the player on the basis of a result of decision made by the goal-achievement-condition decision unit.

15 Claims, 17 Drawing Sheets

(56) References Cited

FOREIGN PATENT DOCUMENTS

| | | | |
|---|---|---|---|
| JP | 2010-162176 | A | 7/2010 |
| JP | 2017-213204 | A | 12/2017 |
| JP | 2020048936 | A | 4/2020 |
| JP | 2020096879 | A | 6/2020 |

OTHER PUBLICATIONS

Written Opinion issued in corresponding International Application No. PCT/JP2022/000629, mailed on Mar. 22, 2022 (4 pages).

Office Action issued in counterpart Japanese Patent Application No. 2021-005106 mailed on Nov. 1, 2021 (11 pages).

Office Action issued in counterpart Japanese Patent Application No. 2021-005106 mailed on Jul. 19, 2021 (11 pages).

Browser games on a smartphone: the Idol Master Shinycolor; Weekly Famitsu No. 1535; vol. 33, No. 20, serial No. 1535, pp. 134-140; Apr. 26, 2018 (13 pages).

* cited by examiner

FIG. 7

| GOAL-ACHIEVEMENT-CONDITION ID | GAME MEDIUM ID | GAME MEDIUM NAME | ORDER | TURN | TIME | GOAL ACHIEVEMENT TYPE | RACE NAME | GOAL ACHIEVEMENT CONDITION 1 | GOAL ACHIEVEMENT CONDITION 2 | TARGET-RACE DETERMINATION PARAMETER |
|---|---|---|---|---|---|---|---|---|---|---|
| 1 | 1001 | CHARACTER A | 1 | 12 | YEAR 1, 2nd HALF OF JUNE | 1 | ×× RACE 1 | 0 | 0 | 0 |
| 2 | 1001 | CHARACTER A | 2 | 27 | YEAR 2, 1st HALF OF FEB. | 1 | ×× SHO 1 | 5 | 0 | 0 |
| 3 | 1001 | CHARACTER A | 3 | 34 | YEAR 2, 2nd HALF OF MAY | 1 | ×× DERBY | 5 | 0 | 0 |
| 4 | 1001 | CHARACTER A | 4 | 44 | YEAR 2, 2nd HALF OF OCT. | 1 | ×× SHO 2 | 3 | 0 | 0 |
| 5 | 1001 | CHARACTER A | 5 | 56 | YEAR 3, 2nd HALF OF APRIL | 1 | ×× SHO 3 (SPRING) | 3 | 0 | 0 |
| 6 | 1001 | CHARACTER A | 6 | 70 | YEAR 3, 2nd HALF OF NOV. | 1 | ×× CUP 1 | 2 | 0 | 0 |
| 7 | 1001 | CHARACTER A | 7 | 72 | YEAR 3, 2nd HALF OF DEC. | 1 | ×× KINEN | 1 | 0 | 0 |
| 8 | 1001 | CHARACTER A | 8 | 74 | YEAR 4, 2nd HALF OF JAN. | 1 | ×× RACE PRELIMINARY | 1 | 0 | 0 |
| 9 | 1001 | CHARACTER A | 9 | 76 | YEAR 4, 2nd HALF OF JAN. | 1 | ×× RACE SEMIFINAL | 1 | 0 | 0 |
| 10 | 1001 | CHARACTER A | 10 | 78 | YEAR 4, 2nd HALF OF JAN. | 1 | ×× RACE FINAL | 1 | 0 | 0 |
| 11 | 1006 | CHARACTER B | 1 | 12 | YEAR 1, 2nd HALF OF JUNE | 1 | ×× RACE 2 | 0 | 0 | 0 |
| 12 | 1006 | CHARACTER B | 2 | 24 | YEAR 1, 2nd HALF OF DEC. | 3 | – | 3000 | 0 | 0 |
| 13 | 1006 | CHARACTER B | 3 | 33 | YEAR 2, 1st HALF OF MAY | 1 | ×× CUP 2 | 5 | 0 | 0 |
| 14 | 1006 | CHARACTER B | 4 | 46 | YEAR 2, 2nd HALF OF NOV. | 1 | ×× CHAMPIONSHIP | 3 | 0 | 0 |
| 15 | 1006 | CHARACTER B | 5 | 48 | YEAR 2, 2nd HALF OF DEC. | 1 | ×× KINEN | 3 | 0 | 0 |
| 16 | 1006 | CHARACTER B | 6 | 60 | YEAR 3, 2nd HALF OF JUNE | 2 | WIN WITHIN 3rd PLACE TWO OR MORE TIMES IN HIGHEST-GRADE RACE | 3 | 2 | 0 |
| 17 | 1006 | CHARACTER B | 7 | 68 | YEAR 3, 2nd HALF OF OCT. | 1 | ×× SHO 3 (AUTUMN) | 1 | 0 | 0 |
| 18 | 1006 | CHARACTER B | 8 | 72 | YEAR 3, 2nd HALF OF DEC. | 1 | ×× KINEN | 1 | 0 | 0 |
| 19 | 1006 | CHARACTER B | 9 | 74 | YEAR 4, 2nd HALF OF JAN. | 1 | ×× RACE PRELIMINARY | 1 | 0 | 0 |
| 20 | 1006 | CHARACTER B | 10 | 76 | YEAR 4, 2nd HALF OF JAN. | 2 | ×× RACE SEMIFINAL | 1 | 0 | 0 |
| 21 | 1006 | CHARACTER B | 11 | 78 | YEAR 4, 2nd HALF OF JAN. | 3 | ×× RACE FINAL | 1 | 0 | 0 |
| 22 | 1009 | CHARACTER C | 1 | 12 | YEAR 1, 2nd HALF OF JUNE | 1 | ×× RACE 3 | 0 | 0 | 0 |
| 23 | 1009 | CHARACTER C | 2 | 29 | YEAR 2, 1st HALF OF MARCH | 1 | ×× SHO 4 | 5 | 0 | 0 |
| 24 | 1009 | CHARACTER C | 3 | 31 | YEAR 2, 1st HALF OF APRIL | 1 | ×× SHO 5 | 5 | 0 | 0 |
| 25 | 1009 | CHARACTER C | 4 | 34 | YEAR 2, 2nd HALF OF MAY | 1 | ×× RACE 4 | 5 | 0 | 1 |
| 291 | 1009 | CHARACTER C | 4 | 34 | YEAR 2, 2nd HALF OF MAY | 1 | ×× DERBY | 5 | 0 | 2 |
| ⋮ | ⋮ | ⋮ | ⋮ | ⋮ | ⋮ | ⋮ | ⋮ | ⋮ | ⋮ | ⋮ |

PROGRAM, ELECTRONIC DEVICE, METHOD, AND SYSTEM

TECHNICAL FIELD

The present invention relates to a program, etc., and in particular to a program, etc. for a raising game in which a game medium selected by a player is raised.

BACKGROUND ART

In recent years, with the rapid spread of electronic devices including smartphones, many games executed on electronic devices have been released. Among this type of games, there are known games in which a game medium, such as a racehorse, is raised. There are well-known simulation games in which a player selects a stallion and a mare, serving as parent horses, and produces and raises a child horse from these parent horses (refer to, for example, PTL 1).

CITATION LIST

Patent Literature

{PTL 1}

Japanese Unexamined Patent Application, Publication No. 2002-126349

SUMMARY OF INVENTION

Technical Problem

In raising games in which game media selected from a plurality of game media serve as game media to be raised, the selected game media, if raised through a game common among the game media, are likely be raised according to a player's preference and thus result in uniform or monotonous raising strategies, which makes the raising games boring.

The present invention has been conceived in order to solve such a problem, and an object thereof is to provide a program, an electronic device, a method, and a system that can provide diverse raising experiences.

Solution to Problem

A program as an aspect of the present invention is a program for executing a game including a raising game in which a game medium selected from a plurality of game media serves as a raising game medium, and a parameter associated with said raising game medium is changed through execution of at least one of a plurality of first games common among the plurality of game media. This program causes a computer to function as: a display control means for displaying, on a display device, in a turn constituting the raising game, a raising-command-choice selection screen for accepting selection made by a player from a plurality of raising-related raising command choices including a raising command choice related to execution of the first game; and a raising-game execution means for executing the raising game on the basis of the raising command choice selected by the player in the turn, changing a parameter associated with the raising game medium, and advancing the turn, wherein, in order to assist the player in selecting the raising command choice, the display control means displays, on the display device, a goal achievement condition for the raising game medium, said goal achievement condition being set so as to be associated with the game media and being different for each of the game media, the raising-game execution means has a first-game execution means for executing the first game in the case where the selected raising command choice is related to the first game and a goal-achievement-condition decision means for deciding, on the basis of a result of execution of the first game, whether or not the goal achievement condition has been achieved in the case where the first game and the goal achievement condition are associated, and the first-game execution means changes a parameter associated with the player on the basis of a result of decision made by the goal-achievement-condition decision means.

An electronic device as an aspect of the present invention is an electronic device for executing a game including a raising game in which a game medium selected from a plurality of game media serves as a raising game medium, and a parameter associated with said raising game medium is changed through execution of at least one of a plurality of first games common among the plurality of game media. This electronic device includes: a display control means for displaying, on a display device, in a turn constituting the raising game, a raising-command-choice selection screen for accepting selection made by a player from a plurality of raising-related raising command choices including a raising command choice related to execution of the first game; and a raising-game execution means for executing the raising game on the basis of the raising command choice selected by the player in the turn, changing a parameter associated with the raising game medium, and advancing the turn, wherein, in order to assist the player in selecting the raising command choice, the display control means displays, on the display device, a goal achievement condition for the raising game medium, said goal achievement condition being set so as to be associated with the game media and being different for each of the game media, the raising-game execution means has a first-game execution means for executing the first game in the case where the selected raising command choice is related to the first game and a goal-achievement-condition decision means for deciding, on the basis of a result of execution of the first game, whether or not the goal achievement condition has been achieved in the case where the first game and the goal achievement condition are associated, and the first-game execution means changes a parameter associated with the player on the basis of a result of decision made by the goal-achievement-condition decision means.

A method as an aspect of the present invention is a method for executing, by means of an electronic device, a game including a raising game in which a game medium selected from a plurality of game media serves as a raising game medium, and a parameter associated with said raising game medium is changed through execution of at least one of a plurality of first games common among the plurality of game media. This method includes: a display control step for displaying, on a display device, in a turn constituting the raising game, a raising-command-choice selection screen for accepting selection made by a player from a plurality of raising-related raising command choices including a raising command choice related to execution of the first game; and a raising-game execution step for executing the raising game on the basis of the raising command choice selected by the player in the turn, changing a parameter associated with the raising game medium, and advancing the turn, wherein, in the display control step, a goal achievement condition for the raising game medium is displayed on the display device in order to assist the player in selecting the raising command choice, said goal achievement condition being set so as to be associated with the game media and being different for each of the game media, the raising-game execution step includes a first-game execution step for executing the first game in the case where the selected raising command choice is related to the first game and a goal-achievement-condition decision step for deciding, on the basis of a result of execution of the first game, whether or not the goal achievement condition has been achieved in the case where the first game and the goal achievement condition are associated, and in the first-game execution step, a parameter associated with the player is changed on the basis of a result of decision made in the goal-achievement-condition decision step.

A system as an aspect of the present invention is a game system for executing a game including a raising game in which a game medium selected from a plurality of game media serves as a raising game medium, and a parameter associated with said raising game medium is changed through execution of at least one of a plurality of first games common among the plurality of game media. This system includes: an electronic device; and a server connected to the electronic device via a network, wherein the electronic device or the server functions as a display control means for displaying, on a display device, in a turn constituting the raising game, a raising-command-choice selection screen for accepting selection made by a player from a plurality of raising-related raising command choices including a raising command choice related to execution of the first game, the electronic device or the server functions as a raising-game execution means for executing the raising game on the basis of the raising command choice selected by the player in the turn, changing a parameter associated with the raising game medium, and advancing the turn, in order to assist the player in selecting the raising command choice, the display control means displays, on the display device, a goal achievement condition for the raising game medium, said goal achievement condition being set so as to be associated with the game media and being different for each of the game media, the raising-game execution means has a first-game execution means for executing the first game in the case where the selected raising command choice is related to the first game and a goal-achievement-condition decision means for deciding, on the basis of a result of execution of the first game, whether or not the goal achievement condition has been achieved in the case where the first game and the goal achievement condition are associated, and the first-game execution means changes a parameter associated with the player on the basis of a result of decision made by the goal-achievement-condition decision means.

Advantageous Effects of Invention

According to the present invention, diverse raising experiences can be provided.

BRIEF DESCRIPTION OF DRAWINGS

FIG. 7 is an example of a goal-achievement-condition management table.

DESCRIPTION OF EMBODIMENTS

A game system according to an embodiment of the present invention will now be described with reference to the drawings. In this description, there are cases where descriptions that are more detailed than necessary are omitted for convenience of explanation. For example, there are cases where detailed descriptions of matters that are already well known and repeated descriptions of substantially the same configurations are omitted.

This game system can be realized by a system having a plurality of electronic devices connected via a network, but can also be realized by a single electronic device. First, an embodiment realized by a single electronic device is described, and then a system connected to a network is described.

{Embodiment Realized by Electronic Device}

{Configurations}

Figure 1:
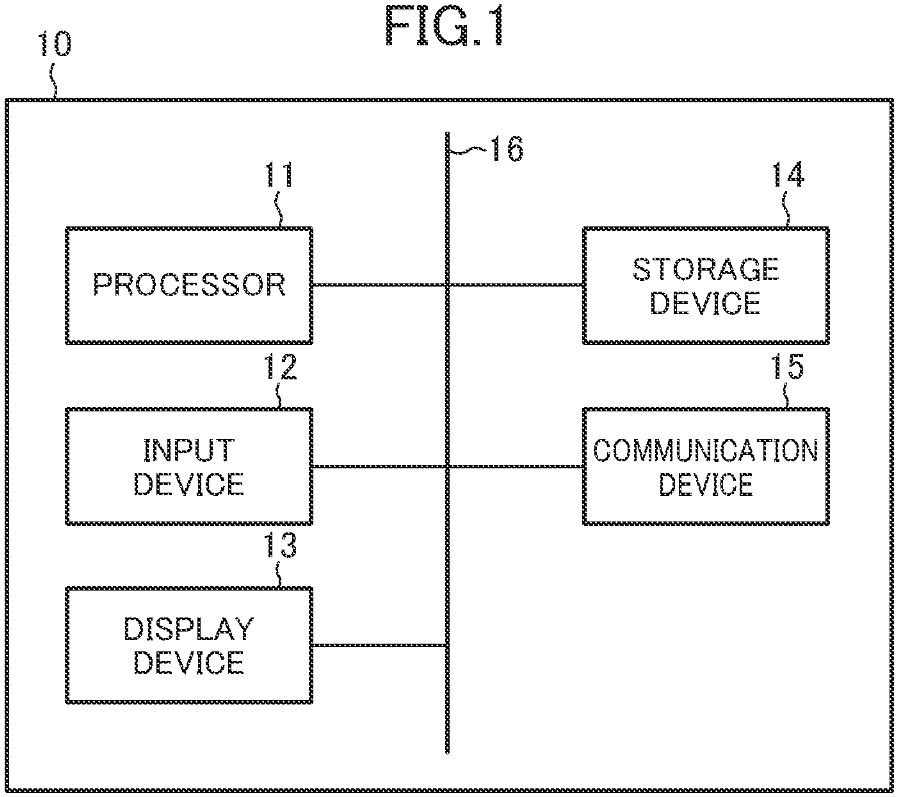
FIG. 1 is a block diagram showing the hardware configuration of an electronic device according to an embodiment of the present invention.

FIG. 1 is a block diagram showing the hardware configuration of an electronic device 10 according to an embodiment of the present invention. The electronic device 10 includes a processor 11, an input device 12, a display device 13, a storage device 14, and a communication device 15. The configurations 11 to 15 are connected via a bus 16. Note that an interface may be interposed, as needed, between the bus 16 and each of the configurations 11 to 15. In this embodiment, the electronic device 10 is a smartphone. Alternatively, the electronic device 10 may be a computer, such as a tablet computer, a laptop personal computer, and a desktop computer, as long as the computer includes the configurations described above.

The processor 11 controls the overall operation of the electronic device 10 and is, for example, an electronic circuit, such as a CPU or an MPU. The processor 11 executes various types of processing by loading programs and data stored in the storage device 14 and then executing the programs. In an example, the processor 11 is constituted of a plurality of processors.

The input device 12 is a user interface for accepting inputs to the electronic device 10 from a user. The input device 12 is, for example, a touchscreen, a touchpad, a keyboard, or a mouse. Because the electronic device 10 in this embodiment is a smartphone, the electronic device 10 includes a touchscreen, which functions both as the input device 12 and as the display device 13. The input device 12 and the display device 13 may be discrete devices that are located at different positions.

The display device 13 presents the user of the electronic device 10, i.e., the player, with application screens, etc. under the control of the processor 11. As the display device 13, a liquid crystal display, an organic EL display, a plasma display, or the like can be used.

The storage device 14 includes a main memory, a buffer memory, and storage and is a storage device provided in a general smartphone or computer, typified by a storage device using a RAM (volatile memory) or a flash memory (nonvolatile memory), such as an eMMC, a UFS, or an SSD, as well as a magnetic storage device. The storage device 14 can include an external memory. The storage device 14 stores, for example, a game application. A game application includes a game program for executing a game and various types of data that are referenced when the game program is executed. The game program is started in response to a user operation on the electronic device 10 and is executed on the operating system (OS) pre-installed in the electronic device 10.

In an example, the storage device 14 includes a main storage device and an auxiliary storage device. The main storage device is a volatile storage medium capable of high-speed reading and writing of information, and is used as a storage area and a work area when the processor 11 processes information. The auxiliary storage device stores various types of programs, as well as data that are used by individual programs when the programs are executed. The auxiliary storage device is, for example, an SSD or a hard disk device; however, the auxiliary storage device may be any type of nonvolatile storage or nonvolatile memory capable of storing information, which may be of the removable type. For example, the auxiliary storage device stores the operating system (OS), middleware, application programs, various types of data that may be referenced when these programs are executed, etc.

The communication device 15 transmits data to and receives data from other computers, such as servers, via a network. For example, the communication device 15 performs wireless communication, such as mobile communication or wireless LAN communication, to connect to the network. In an example, the electronic device 10 downloads a program from a server by means of the communication device 15 and stores the program in the storage device 14. Alternatively, the communication device 15 may perform wired communication by using, for example, an Ethernet® cable. In the case where data is neither transmitted to nor received from other computers, the electronic device 10 need not include the communication device 15.

Figure 2:
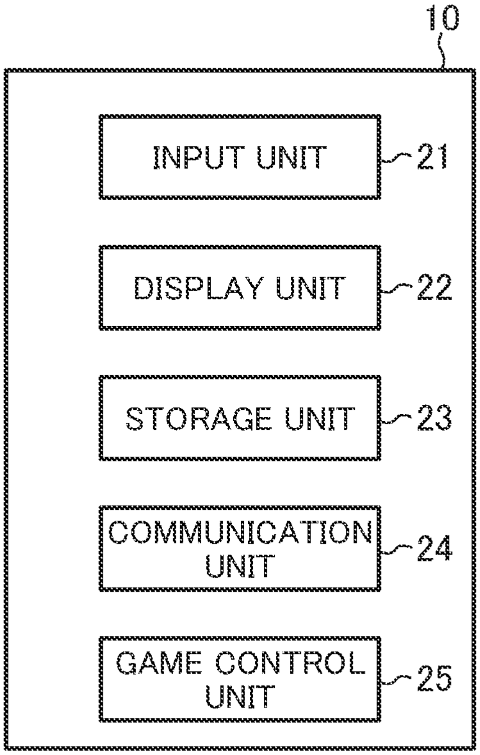
FIG. 2 is an example of a functional block diagram of the electronic device according to an embodiment of the present invention.

FIG. 2 is an example of a functional block diagram of the electronic device 10 according to an embodiment of the present invention. The electronic device 10 includes an input unit 21, a display unit 22, a storage unit 23, a communication unit 24, and a game control unit 25. In this embodiment, these functions are realized by the processor 11 executing a program. For example, the program that is executed is a game program stored in the storage device 14 or a game program received via the communication device 15. Since various types of functions are realized by loading a program, as described above, a portion or the entirety of one part (function) may be provided in another part. Various types of functions are realized as respective means as a result of programs being executed. These functions may be realized by means of hardware by configuring electronic circuits or the like for realizing the individual functions in part or in entirety.

The input unit 21 is constituted using the input device 12 and accepts inputs to the electronic device 10 from the user. In this embodiment, a touch detection function that is provided in touchscreens and that is commonly possessed by smartphones can be used.

The display unit 22 is constituted using the display device 13 and displays, on the display device 13, a game screen according to the game progress and user operations. The storage unit 23 is constituted using the storage device 14 and stores information concerning various types of games and programs. The communication unit 24 is constituted using the communication device 15 and functions as an interface for transmitting/receiving information to/from another information processing device such as a server. The communication unit 24 transmits, to other information processing devices via a network 40, input information that comes from the user and that is accepted by the input unit 21. Also, the communication unit 24 receives information from the other information processing devices and transmits that information to each unit.

The game control unit 25 performs basic control in executing a game in this embodiment. The game in this embodiment includes a main competition game and a raising game. More specifically, a game player raises a game medium in the raising game and uses the raised game medium in the main competition game. A game medium is electronic data used in a game, such as a character, a weapon, an item, a card, or an item of equipment. Game media in this embodiment are characters.

The main competition game in this embodiment is a game in which characters in the form of game media compete for a finish place in a race by running a predetermined distance on a predetermined course, as in a horse race game, and the raising game in this embodiment is a game for raising a game medium that participates in the main competition game.

In this raising game, a game medium selected from a plurality of game media is set as a raising game medium, and parameters associated with the raising game medium are changed through the execution of at least one of a plurality of first games common among the plurality of game media. A first game is a race game in which raising game media (e.g., characters) compete for a finish place in a predetermined race by running a predetermined distance on the course of the race, as in a horse race game. In addition, the raising game may also change parameters associated with the raising game medium through the execution of other types of raising-related games other than the first game. Details of the first game and other types of raising-related games are described below.

In this description, the entire plurality of game media that serve as candidates for raising may also be referred to as a material game medium group, and each of the game media may also be referred to as a material game medium.

That is, the material game medium group is a group of game media configured to include a plurality of material game media. A material game medium is electronic data on which a raising game medium to be raised in the raising game is based, and a unique ID, an image of the character to be displayed on the display device 13, a character ID for uniquely identifying that character, and properties information are associated with the material game medium. Properties information of a material game medium is information indicating properties of the material game medium and is represented by, for example, parameters indicating abilities and skills of the material game medium (character). In this embodiment, a parameter is set for each of all types of propertied information. In other words, if the material game medium does not have an ability or a skill, a predetermined parameter value (e.g., 0) can be set to the ability or the skill, though different types of material game media (characters) have different abilities and skills. In addition, one of a plurality of ranks or levels, such as rarity, is mapped to each of the parameters. Material game media and material game medium groups are pre-stored in the storage device 14, such as a nonvolatile storage. It should be noted, however, that some or all of the material game media may be acquired later by the player in a probability-based lottery game or the like, so that the acquired material game media can be stored in the storage device 14.

A raising game medium is a game medium to be raised in the raising game. At the beginning stage of the raising game, the raising game medium is electronic data generated by duplicating a material game medium selected by the player from the material game medium group. However, the ID of the raising game medium is a unique ID. In other words, the raising game medium is assigned a different ID from that of the selected material game medium. For example, if the ID of a certain material game medium selected by the player is S1, then I1 is assigned as the ID of the raising game medium. In this embodiment, a unique ID, an image of the character to be displayed on the display device 13, a character ID for uniquely identifying that character, and raising parameters indicating properties of the raising game medium are associated with the raising game medium. The image and the character ID of the character of the raising game medium are the same as the image and the character ID of the character of the selected material game medium.

A raising parameter is assigned to each of the properties used in the raising game. At the beginning stage of the raising game, the raising parameters are the same as the parameters of the properties information of the material game medium. Through the progress of the raising game, various types of raising parameters are added or changed. In other words, raising parameters are variables that vary through the raising game. At the beginning stage of the raising game, parameter values of the propertied information of the material game medium selected by the player are assigned to the raising parameters as initial values, and the raising parameters thus have the same parameter values as those of the properties information of the selected material game medium. During the raising game, raising parameters vary on the basis of the aforementioned first game and raising-related game processes (described below), such as training. When a first process (first game) is executed in the raising game or when the raising game is completed, the values of the raising parameters become the parameter values of properties information of the raising game medium the raising of which is completed in the raising game.

In other words, after the completion of the raising game, the value of each of the raising parameters at the completion stage is associated with the character ID included in the raising game medium. The raising parameters need not be associated with the raising game medium during the raising game. In this embodiment, a raising parameter is defined (declared) in the raising game program and is incorporated into the raising game, but is independent of, namely, is not associated with, the character ID during the raising game. For example, the raising game program defines a variable for a character ID and raising parameters separately from each other. Then, when the material game medium selected by the player is duplicated, the character ID of the selected material game medium is read into the variable for the character ID, and the parameter values of the properties information of the selected material game medium are read into the raising parameters. The raising game medium is stored in the storage device 14, such as a volatile recording medium. Because the raising game medium is electronic data based on a material game medium and is independent of that material game medium, as described above, the material game medium is preserved without disappearing. In other words, the player can set the same material game medium as a game medium to be raised for each raising game, any number of times.

In addition, the raising game may have consumption-type parameters associated with the raising game medium, more specifically, the character ID included in the raising game medium. A consumption-type parameter is a value that is valid only during the raising game, such as a parameter that is used and consumed by the player during the raising game. In an example, in the case where there is an ability or a skill that can be gained in exchange for a predetermined number of points through training during the raising game, the predetermined number of points necessary to gain the ability or skill is discounted or reduced by consuming a consumption-type parameter. In another example, a consumption-type parameter is physical strength, in the raising game, of the character identified by the raising game medium, more specifically, the character ID included in the raising game medium. The consumption-type parameter indicating the physical strength is reduced through training in the raising game. Because a consumption-type parameter is a variable that varies in the raising game, the consumption-type parameter can be considered to be a type of raising parameter.

Figure 3:
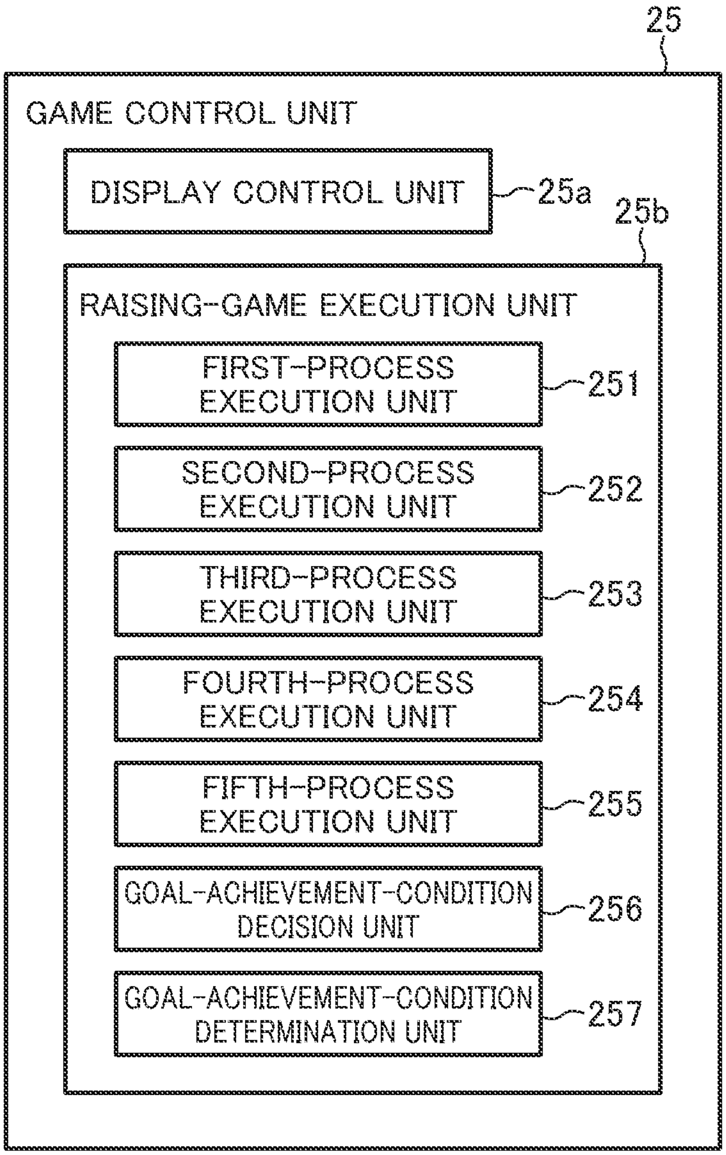
FIG. 3 is an example of a functional block diagram of a game control unit.

FIG. 3 is an example of a functional block diagram of the game control unit. As shown in FIG. 3, the game control unit 25 has a display control unit 25*a* and a raising-game execution unit 25*b*.

The display control unit 25*a* is configured to include the processor 11, controls the display device 13, displays a predetermined screen on the display device 13, and accepts a predetermined operation performed by the player via the screen and the input device 12.

The display control unit 25*a* in this embodiment displays, on the display device 13, for example, a raising-game-medium selection screen G1, a raising-command-choice selection screen G2, a goal-achievement-condition detailed screen G3, a training command selection screen G4, and a target-race determination event screen G5. The raising-command-choice selection screen G2, the goal-achievement-condition detailed screen G3, and the training command selection screen G4 will be described below.

Figure 4:
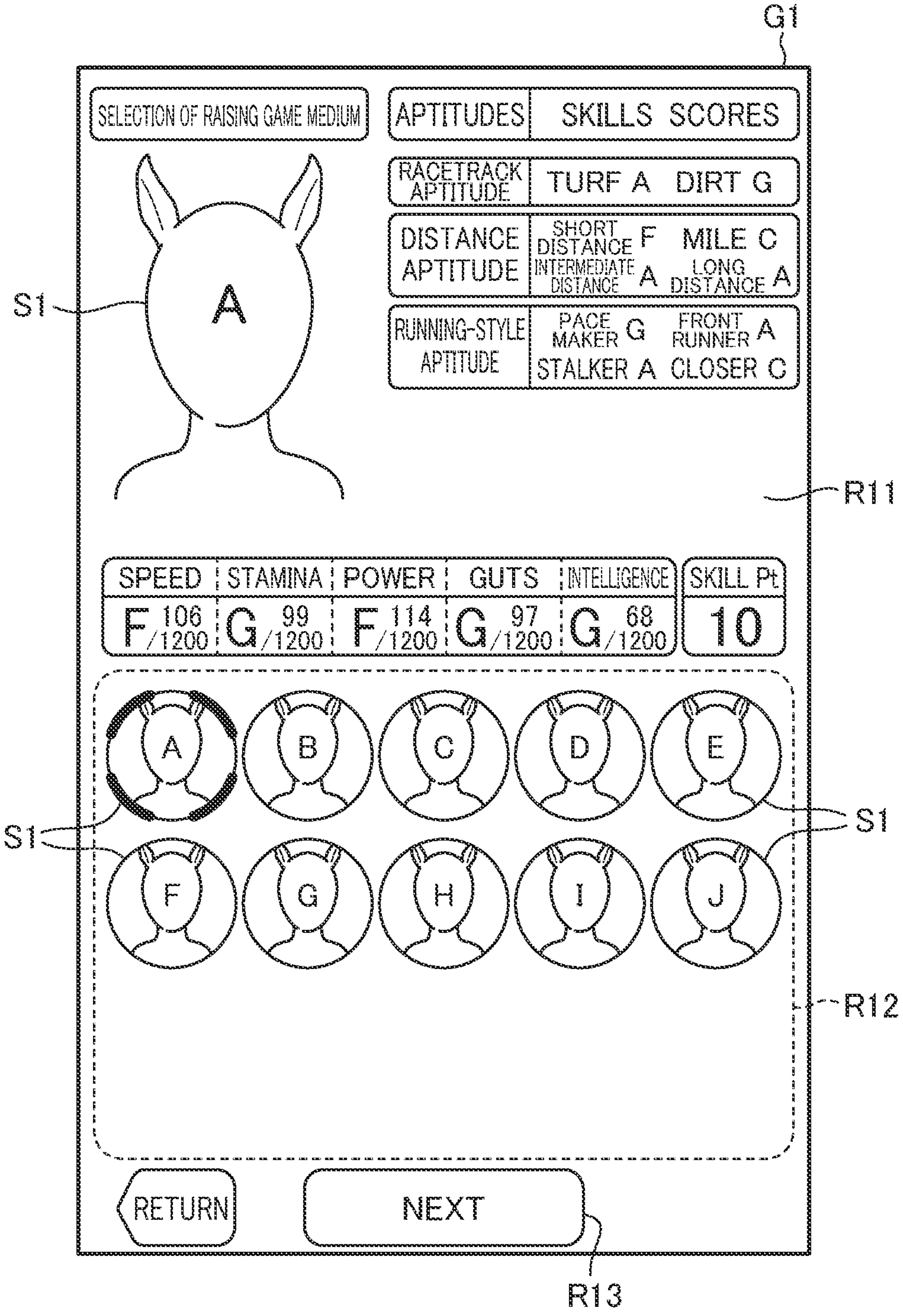
FIG. 4 is an example of a raising-game-medium selection screen.

FIG. 4 is an example of the raising-game-medium selection screen. As shown in FIG. 4, in response to a player operation on, for example, a start screen, the display control unit 25*a* displays the raising-game-medium selection screen G1 on the display device 13 and accepts a selection of a material game medium made by the player via the input device 12. The raising-game-medium selection screen G1 includes a material-game-medium-group display region R12, a selected-material-game-medium display region R11, and a determination button R13.

Material game media (e.g., images S1 thereof) are displayed in the material-game-medium-group display region R12. In the example shown FIG. 4, the images S1 of a plurality of material game media (characters A to J here) are displayed. In this embodiment, because the display device 13 and the input device 12 are constituted of the touchscreen of the electronic device 10, the display control unit 25*a* can accept selection of one material game medium displayed in the material-game-medium-group display region R12 with a finger or the like of the player.

The selected-material-game-medium display region R11 is displayed to include the image S1 and the properties information of the material game medium selected from the plurality of material game media. The properties information includes, for example, basic ability parameters indicating speed, stamina, power, guts, and intelligence and aptitude parameters including racetrack aptitude, distance aptitude, and running-style aptitude. The racetrack aptitude includes, for example, an aptitude for a turf track and an aptitude for a dirt track. The distance aptitude includes, for example, a short-distance aptitude, a mile aptitude, an intermediate-distance aptitude, and a long-distance aptitude. The running-style aptitude includes a pacemaker aptitude, a front runner aptitude, a stalker aptitude, and a closer aptitude. Each parameter is, for example, a numerical value and, in addition to the numerical value, can be indicated by a rank or level, such as A, B, or C, according to the stage, as an example. For example, rank A represents the highest aptitude, and the farther from rank A the aptitude is, the lower the aptitude becomes. In an example, if the speed parameter is displayed with rank A, it indicates a high-speed feature, and if the speed parameter is displayed with rank G, it indicates a low-speed feature.

The determination button R13 is a button for determining that the selected material game medium is a raising game medium to be raised in the raising game. The display control unit 25*a* receives a signal indicating that the input device 12 has detected the determination button R13 being pressed, identifies the material game medium that is selected in the material-game-medium-group display region R12 at that time, duplicates the material game medium, assigns a different ID, and stores the duplicated material game medium in the storage device 14 as a raising game medium.

The raising-game execution unit 25*b* is configured to include the processor 11, controls the entire raising game on the basis of a player operation acquired from the display control unit 25*a*, and executes the raising game. The raising game is configured from a plurality of turns. The raising-game execution unit 25*b* determines a raising-related choice on the basis of a player operation in each turn, executes a raising-related game by executing a command process based on that choice, changes parameters associated with the raising game medium, and advances the turn to the next turn. That is, the player selects at least one raising-related game in one turn, and, on the basis of that selection, the one raising-related game is executed in turns including that turn. Typically, one raising-related game is executed in one turn. In an example, the raising-game execution unit 25*b* ends the raising game when the games in the turns are executed sequentially.

A raising-related game is a game in which parameters associated with the raising game medium are changed, and, in this embodiment, the raising-related game includes a first process, a second process, a third process, a fourth process, and a fifth process. The first to fifth processes are processes for producing a game result by executing, on the basis of a predetermined choice selected by the player, a predetermined process corresponding to that choice. As described above, the first process is a process for making the raising game medium enter a predetermined race and executing a race game in which the raising game medium competes for a finish place in that race. This first process is also referred to simply as a "first game". The second process is a process for training the character of the raising game medium and changing a parameter associated with the raising game medium according to a selection made by the player regarding the type of the parameter. The third process, fourth process, and fifth process are processes for changing predetermined parameters that correspond to the respective choices and that are associated with the raising game medium. The third process is a process related to resting of the character of the raising game medium and changes a parameter related to physical strength (e.g., physical strength parameter) associated with the raising game medium. The fourth process is a process related to treatment of the character of the raising game medium and changes a parameter related to a failure (e.g., failure parameter) associated with the raising game medium by proceeding with at least one turn. The fifth process is a process related to biorhythm (motivation) and changes a parameter related to motivation (e.g., motivation parameter) associated with the raising game medium. The first to fifth processes differ in game process and parameter variation width. In this embodiment, parameters associated with the raising game medium while the first game is running more greatly contribute to a game result than parameters associated with the raising game medium while the other second to fifth processes are running. For example, even if all parameter values associated with the raising game medium while each game is running are the same, the first game leads to a greater parameter variation width resulting from execution of the game than the other second to fifth processes.

Figure 5:
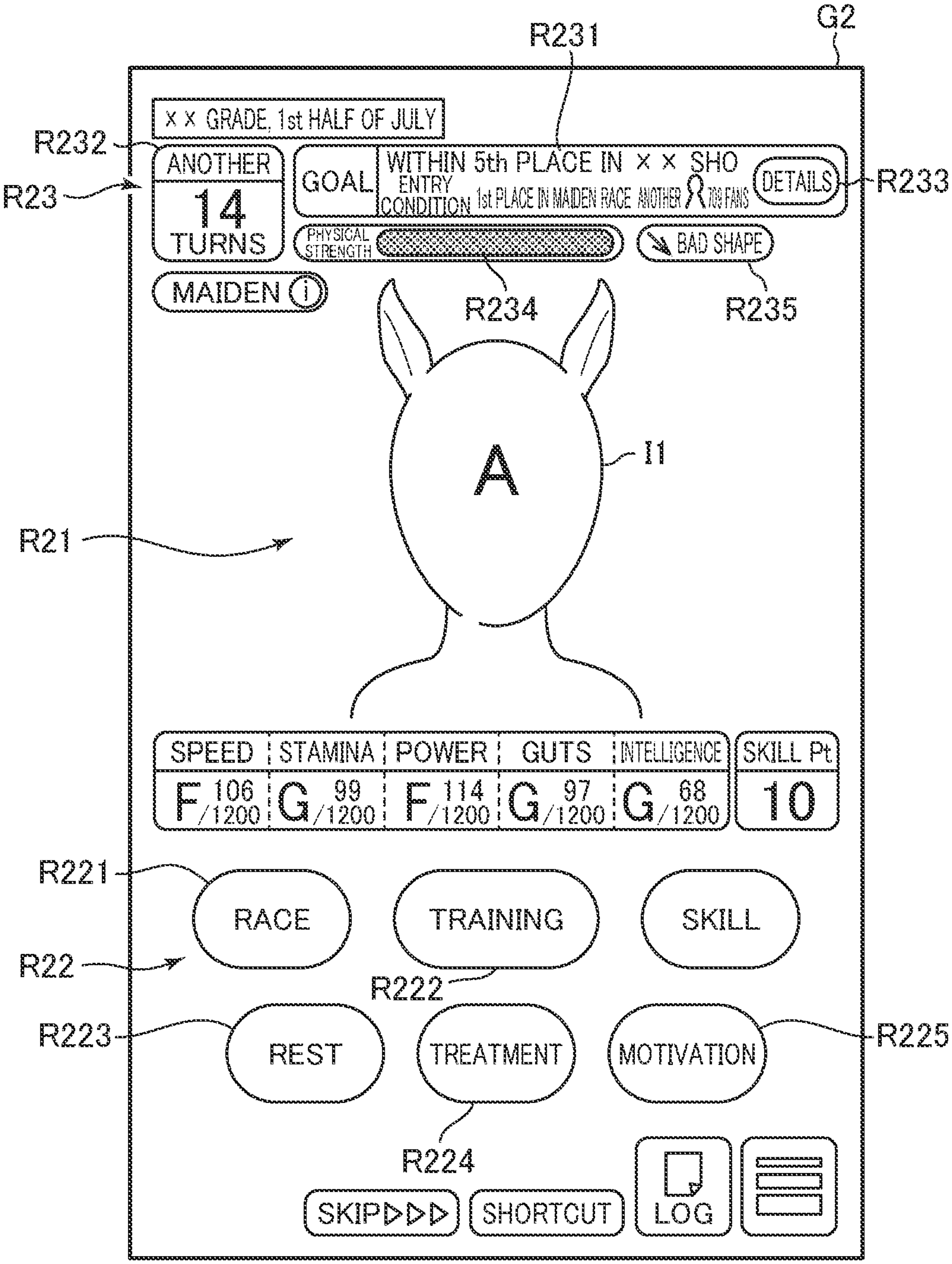
FIG. 5 is an example of a raising-command-choice selection screen.

FIG. 5 is an example of the raising-command-choice selection screen. As shown in FIG. 5, in a turn constituting the raising game, the display control unit 25*a* displays, on the display device 13, the raising-command-choice selection screen G2 for accepting a selection made by the player from a plurality of raising-related raising command choices including the raising command choice related to execution of the first game.

In the example shown in FIG. 5, the raising-command-choice selection screen G2 includes a raising-game-medium display region R21, a raising-command-choice display region R22, and a goal-achievement-condition display region R23.

In the raising-game-medium display region R21, a raising game medium, as well as parameters associated with the raising game medium, is displayed. Here, an image I1 of the raising game medium; parameter values related to speed, stamina, power, guts, and intelligence, which are parameters related to the properties of the raising game medium; and the level or rank corresponding to each of the parameter values are displayed in the raising-game-medium display region R21.

In the raising-command-choice display region R22, a plurality of raising command choices for selecting respective raising-related games are displayed. The raising command choices are display buttons corresponding to the i-th processes (i=1 to 5). That is, a first raising command choice R221 shown in FIG. 5 corresponds to the first game, which is a race game, and a second raising command choice R222 corresponds to the second process, which is a training game. A third raising command choice R223 corresponds to the third process related to a rest, a fourth raising command choice R224 corresponds to the fourth process related to treatment, and a fifth raising command choice R225 corresponds to the fifth process related to biorhythm. On the basis of the selection of the i-th raising command choice R22*i* made by the player, it is possible to execute the i-th process by means of the raising-game execution unit 25*b* (more specifically, the i-th process execution unit 25*i* described below).

In the goal-achievement-condition display region R23, a goal achievement condition for the raising game medium is displayed. That is, the display control unit 25*a* displays a goal achievement condition for the raising game medium on the display device 13. The raising-command-choice selection screen G2 is one of the screens on which a goal achievement condition is displayed.

A goal achievement condition is a condition the player intends to achieve in raising a game medium and is set in association with the game medium. Goal achievement conditions differ for each game medium. In an example, a goal achievement condition can be set in association with the unique ID of the game medium. In another example, a goal achievement condition can be set in association with the character ID of the game medium. The player can be assisted in selecting a raising command choice as a result of the display control unit 25*a* displaying, on the display device 13, a goal achievement condition for the raising game medium.

Goal achievement conditions are roughly classified into a place-winning-goal-achievement condition and a predetermined-number-of-times place-winning-goal-achievement condition that include winning a finish place in a race, as well as a fan-number-gaining-goal-achievement condition that does not include winning a finish place in a race. A target race and a finish place in that target race are associated with the place-winning-goal-achievement condition and the predetermined-number-of-times place-winning-goal-achievement condition.

The place-winning-goal-achievement condition is a condition that is achieved when the player wins within a predetermined finish place in a predetermined target race before a predetermined turn comes. Typically, the place-winning-goal-achievement condition is a condition that is achieved when the player wins within a predetermined finish place in a predetermined target race in a predetermined turn. The predetermined-number-of-times place-winning goal is a condition that is achieved when the player wins within a predetermined finish place in predetermined target races of a predetermined or higher grade a predetermined number of times. The predetermined-number-of-times place-winning goal is a condition in which a plurality of predetermined races of a predetermined or higher grade are set as target races and includes, as parameters, a certain finish place in the target races and the number of times the player wins within the certain finish place. The fan-number-gaining-goal-achievement condition is a condition that is achieved when the player gains a predetermined number of fans before a predetermined turn comes. Note that a number of fans can be gained on the basis of the result of a race executed in the raising-game execution unit 25*b* (more specifically, a first-process execution unit 251 described below). For example, the closer to the first finish place the player is, the larger the number of fans the player can gain. The parameter indicating the number of fans can be stored in the storage device 14 in association with the player or the raising game medium and can be read out, as needed.

Goal achievement conditions are set in association with at least some turns in the raising game. For example, if the raising game consists of 70 turns, goal achievement conditions can be set every 5 to 10 turns. The number of goal achievement conditions and the turn intervals at which goal achievement conditions are associated are not limited to the above, and may be set by a game developer as appropriate.

By setting goal achievement conditions in association with some turns, it is possible to increase the number of variations in raising even if multiple first games (race games) that can be executed or selected are common among game media. For example, if it is assumed that there are N types of first games common among game media, the total number of turns is N in each of the game media, and there is one way to arrange the first games (i.e., NCN), then there is only one raising route in all game media in the case where no goal achievement conditions are set. Therefore, the same raising strategy can be applied regardless of the type of game medium, and no matter which game medium is selected as the raising game medium, the raising game will easily become uniform or monotonous. On the other hand, if goal achievement conditions are set in association with k ($k<N$) turns of the N turns (N race games) under the same conditions as above, there will be ${}_NC_k$ different combinations of goal achievement conditions to be set. This means that the number of variations in raising route can be increased by a factor of ${}_NC_k$ by setting goal achievement conditions. If N=10 and k=5 as an example, then the number of variations can be increased by a factor of ${}_NC_k$=252, and if N=100 and k=5 as another example, then the number of variations can be increased by a factor of ${}_NC_k$=75,287,520. Note that N and k can be any natural number satisfying $1 \leq k < N$. The larger the number N is, the larger the number of variations can become.

Figure 6:
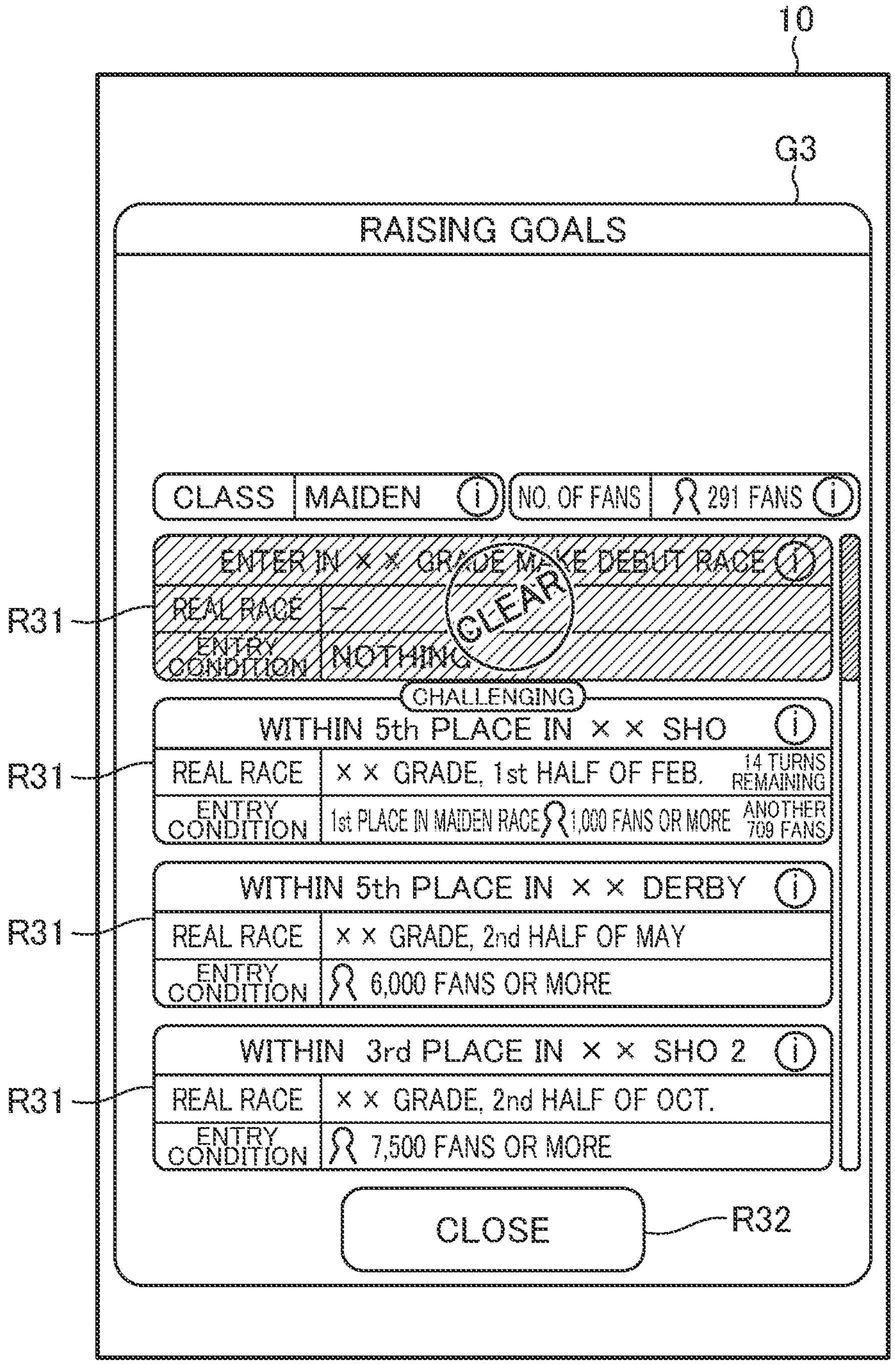
FIG. 6 is an example of a goal-achievement-condition detailed screen.

Here, refer to FIG. 6. FIG. 6 is an example of the goal-achievement-condition detailed screen. As shown in FIG. 6, the goal-achievement-condition detailed screen G3 displays the goal achievement conditions set for the raising game medium. That is, by referring to a goal-achievement-condition management table (described below), the display control unit 25*a* displays, on the display device 13, the goal-achievement-condition detailed screen G3 including the goal achievement conditions set for the raising game medium. The goal-achievement-condition detailed screen G3 may list the goal achievement conditions set for the raising game medium or may allow the player to confirm all the goal achievement conditions by scrolling, etc. The display control unit 25*a* can display the goal-achievement-condition detailed screen G3 when a raising game medium is selected and/or while the raising game is in progress (e.g., in each turn). That is, the player can confirm the goal achievement conditions when a raising game medium is selected or while the raising game is in progress.

In the example shown in FIG. 6, the goal-achievement-condition detailed screen G3 displays a class indicating the grade of the raising game medium, the number of gained fans, a plurality of goal-achievement-condition indications R31, and a close button R32. The number of gained fans represents the number of fans that have been associated with the raising game medium or the player until the time at which the goal-achievement-condition detailed screen G3 is displayed.

The goal-achievement-condition indications R31 display goal achievement conditions associated with the raising game medium. In the example shown in FIG. 6, place-winning goals are displayed as goal achievement conditions. In each of the goal-achievement-condition indications R31, a prerequisite, if any, for entering the race associated with that goal achievement condition (may be referred to just as a "target race" hereinafter) may be displayed. A prerequisite can include condition 1 for winning within a predetermined finish place in a race of a predetermined grade, condition 2 for gaining a predetermined number of fans or more, and the combination of condition 1 and condition 2. The grade of the race in condition 1 may be lower than the grade of the target race. This allows the player to enjoy the raising game while gradually stepping up. Also, as shown in FIG. 6, a mark indicating that the goal has been achieved may be displayed in the indication R31 for a goal achievement condition that has been achieved, and the region of that indication R31 may be grayed out. In addition, the indication R31 for the next goal achievement condition closest to the current turn may be highlighted. Furthermore, the remaining number of turns until that next goal achievement condition and the remaining number of fans to be gained until condition 2 is achieved may be displayed. Also, a prerequisite that has been achieved may be hidden or a mark indicating that the prerequisite has been achieved may be displayed in the goal-achievement-condition indication R31. The remaining number of fans to be gained until condition 2 is achieved can be acquired by causing the display control unit 25*a* to calculate the difference between the number of fans required to satisfy condition 2 and the number of gained fans indicated when the goal-achievement-condition detailed screen G3 is displayed.

The close button R32 is a button for transitioning to the original screen as a result of being pressed by the player. In this embodiment, the close button R32 causes a transition to the raising-command-choice selection screen G2 by means of the display control unit 25*a*, as described below. In another example, with the close button R32, the display control unit 25*a* may cause a transition to a raising game start screen appearing after a raising game medium has been selected.

Refer to FIG. 5 again. As shown in FIG. 5, the goal-achievement-condition display region R23 is displayed to include a virtual time in the raising game corresponding to the current turn, a next-goal-achievement-condition indication R231 indicating the next goal achievement condition closest to the current turn, a remaining-turn-number indication R232 indicating the remaining number of turns until the turn associated with the next goal achievement condition, a detail button R233, a physical strength parameter indication R234, and a motivation indication R235.

The next-goal-achievement-condition indication R231 displays the next goal achievement condition that comes earliest after the current turn. More specifically, in a certain turn not associated with a goal achievement condition, the display control unit 25*a* displays, on the display device 13, as the next goal achievement condition, a goal achievement condition associated with the earliest of the turns that come after the certain turn and that are associated with goal achievement conditions. In the example shown in FIG. 5, a place-winning goal is displayed.

In a turn not associated with a goal achievement condition, the display control unit 25*a* displays, on the display device 13, a prerequisite for allowing the first game associated with the next goal achievement condition to be executed. Here, in the case where a prerequisite is set in the next goal achievement condition, the display control unit 25*a* displays the prerequisite on the raising-command-choice selection screen G2 (more specifically, in the next-goal-achievement-condition indication R231 thereof). A prerequisite can include condition 1 for winning within a predetermined finish place in a race of a predetermined grade, condition 2 for gaining a predetermined number of fans or more, and the combination of condition 1 and condition 2. The grade of the race in condition 1 may be lower than the grade of the target race. This allows the player to enjoy the raising game while gradually stepping up. The grade of the race in condition 1 may be lower than the grade of the target race. This allows the player to enjoy the raising game while gradually stepping up. In the next-goal-achievement-condition indication R231, the remaining number of fans to be gained until condition 2 is achieved may be displayed. Also, a prerequisite that has been achieved may be hidden or a mark indicating that the prerequisite has been achieved may be displayed in the goal-achievement-condition indication R31. The remaining number of fans to be gained until condition 2 is achieved can be acquired by, for example, causing the display control unit 25*a* to calculate the difference between the number of fans required to satisfy condition 2 and the number of gained fans indicated when the raising-command-choice selection screen G2 is displayed.

The remaining-turn-number indication R232 displays the number of turns from the current turn until the closest turn associated with the next goal achievement condition. More specifically, in a turn not associated with a goal achievement condition, the display control unit 25*a* displays the remaining number of turns on the display device 13. The remaining number of turns is the difference between a certain turn not associated with a goal achievement condition and the turn that comes earliest after that certain turn and that is associated with a goal achievement condition. Here, the display control unit 25*a* calculates the difference between the turn associated with the next goal achievement condition (may be referred to simply as a "next target turn" hereinafter) and the current turn and displays the result of the calculation as the remaining number of turns on the raising-command-choice selection screen G2. The next target turn is acquired, for example, by causing the display control unit 25*a* to read, from the goal-achievement-condition management table (described below), the number of turns from the current turn until the closest turn mapped to the next goal achievement condition.

The detail button R233 is a button for transitioning from the raising-command-choice selection screen G2 to the goal-achievement-condition detailed screen G3. The physical strength parameter indication R234 displays a physical strength parameter that is associated with the raising game medium and that is a value at the time the raising-command-choice selection screen G2 is displayed. That is, the physical strength parameter indication R234 indicates the physical strength parameter of the raising game medium in the current turn. This physical strength parameter may also be indicated in the form of a rank. The motivation indication R235 displays the rank corresponding to the motivation parameter that is associated with the raising game medium and that is a value at the time the raising-command-choice selection screen G2 is displayed (i.e., in the current turn of the raising game medium).

FIG. 7 is an example of the goal-achievement-condition management table. The goal-achievement-condition management table maps the ID of a game medium, a goal-achievement-condition ID for identifying a goal achievement condition, and the content of the goal achievement condition to one another. More specifically, the goal-achievement-condition management table is a table in which the race name of the first game associated with the goal achievement condition, the race ID for identifying that race, the grade ID for identifying the grade of that race, the turn in which that race game is executed, a virtual game-holding time in the raising game at which that race game is executed, the type of the goal achievement condition, achievement condition parameters, and a target-race determination parameter are mapped to one another. This goal-achievement-condition management table is stored in the storage device 14. A turn-number/game-holding-time table in which the number of turns and a game-holding time are mapped to each other and a race/game-holding-time table in which a race and a game-holding time thereof are mapped to each other may be stored separately in the storage device 14. In the race/game-holding-time table, it is possible to define a race that the player can enter only at a predetermined time, a race that the player can enter at a predetermined time and later, and a race that the player can enter at any time.

The first game associated with the goal achievement condition can be common to all or some of the game media. For example, all or some of the races associated with the 30th turn of a character A are made common to all or some of the races associated with the 50th turn of a character B.

In this embodiment, the type of a goal achievement condition is one of the place-winning-goal-achievement condition, the predetermined-number-of-times place-winning-goal-achievement condition, and the fan-number-gaining-goal-achievement condition. In the example shown in FIG. 7, "1", "2", and "3" are assigned as type parameter values of the place-winning-goal-achievement condition, the predetermined-number-of-times place-winning-goal-achievement condition, and the fan-number-gaining-goal-achievement condition, respectively. Note that the place-winning-goal-achievement condition, the predetermined-number-of-times place-winning-goal-achievement condition, and the fan-number-gaining-goal-achievement condition are also referred to just as a place-winning goal, a predetermined-number-of-times place-winning goal, and a fan-number-gaining goal.

One achievement condition parameter is set in the place-winning goal and the fan-number-gaining goal, and two achievement condition parameters are set in the predetermined-number-of-times place-winning goal. The achievement condition parameter for the place-winning goal indicates a finish place in the race in the place-winning goal, and the achievement condition parameter for the fan-number-gaining goal indicates the number of fans. For example, the achievement condition parameter corresponding to the 27th turn of the character A in FIG. 7 is 5. That is, the goal achievement condition in that turn indicates a place-winning goal aiming at winning within the fifth finish place in the race held in that turn. In addition, the achievement condition parameter corresponding to the 24th turn of the character B in FIG. 7 is 3000. That is, the goal achievement condition in that turn indicates a fan-number-gaining goal aiming at gaining 3000 fans until that turn comes. The achievement condition parameters for the predetermined-number-of-times place-winning goal indicate a target finish place in the race and the number of times the goal is achieved. Achievement condition parameter 1 indicates a target finish place in the race, and achievement parameter 2 indicates the number of achievements. For example, the goal achievement condition corresponding to the 60th turn of the character B in FIG. 7 indicates a predetermined-number-of-times place-winning goal aiming at winning, at least two times, within the third finish place in the target race of a predetermined or higher grade. Note that a numerical value 0 assigned to the achievement condition parameter (achievement condition parameter 1 in the case of the predetermined-number-of-times place-winning goal) means that this goal achievement condition aims at only entering the target race. Therefore, a goal-achievement-condition decision unit 256 decides that the goal achievement condition has been achieved on the basis of the player having entered that target race.

The target-race determination parameter is a parameter for determining a target race associated with a goal achievement condition during the raising game. The target-race determination parameter corresponds to the choice of races presented by the player, a predetermined parameter of the raising game medium, and the result of a lottery process. For example, if the races presented to the player in a turn in which a target race is to be determined are race 1 and race 2, "1" can be mapped to race 1 as the target-race determination parameter, and "2" can be mapped to race 2 as the target-race determination parameter. Also, in a turn in which a target race is to be determined, "1" can be mapped as the target-race determination parameter in the case where the motivation parameter of the raising game medium is equal to or larger than a predetermined value, and "2" can be mapped as the target-race determination parameter in the case where the motivation parameter is less than the predetermined value. Furthermore, in a turn in which a target race is to be determined, if it is assumed that the lottery process outputs a real number from 0 to 1, "1" can be mapped to a real number from 0 inclusive to 0.5 exclusive as the target-race determination parameter, and "2" can be mapped to a real number from 0.5 to 1 inclusive as the target-race determination parameter.

In the case where the first raising command choice R221 related to execution of the first game is selected, the display control unit 25*a* displays, on the display device 13, an indication (race selection screen) for accepting selection of at least one first game (race). For example, in a turn not associated with a goal achievement condition, the display control unit 25*a* displays, on the display device 13, an indication for accepting selection of a plurality of first games, so that the player can select one of the first games on the indication. The grade of a first game may be displayed on this indication so as to assist in formulating a raising strategy for the raising game medium. In a turn associated with a goal achievement condition, the display control unit 25*a* displays, on the display device 13, only the first game associated with that goal achievement condition as a first game that can be selected by the player.

As shown in FIG. 3, the raising-game execution unit 25*b* has the first-process execution unit 251, a second-process execution unit 252, a third-process execution unit 253, a fourth-process execution unit 254, a fifth-process execution unit 255, the goal-achievement-condition decision unit 256, and a goal-achievement-condition determination unit 257.

The first-process execution unit 251 can also be referred to as a first-game execution unit 251. In the case where the raising command choice selected by the player on the raising-command-choice selection screen G2 is related to the first game, the first-process execution unit 251 executes a first game (first process). More specifically, after accepting selection of the first raising command choice R221 made by the player on the raising-command-choice selection screen G2, the display control unit 25*a* displays the race selection screen (not shown in the figure) on the display device 13, and the first-process execution unit 251 executes the first game selected by the player on that race selection screen. More specifically, the display control unit 25*a* displays at least one race type on the race selection screen. This displayed race type can be identified, for example, as a result of the first-process execution unit 251 executing a first-game-type identification process. In more detail, first games are managed as a result of table data that associates a race type (e.g., xx derby, xx oaks, etc.) with a turn in which that race can be executed being stored in the storage device 14, and game media and this table data are managed in association with each other. In addition, by referring to the table data at a timing such as when a turn starts or when a first raising command choice is accepted, the first-process execution unit 251 identifies the ID of the raising game medium and the race type associated with the current turn. In an example, in the case where the current turn is not associated with a goal achievement condition, the first-process execution unit 251 identifies at least two race types, and the identified race types are displayed on the race selection screen by the display control unit 25*a* as races that can be selected by the player. In another example, in the case where the current turn is associated with a goal achievement condition, the first-process execution unit 251 identifies the target race associated with that goal achievement condition as a race type to be displayed on the race selection screen, and the identified race type is displayed on the race selection screen by the display control unit 25*a* as a race that can be selected by the player. Note that, in the first-game-type identification process, the type of the first game may be identified on the basis of a parameter of the raising game medium (e.g., ID indicating the sex of the character of the game medium, raising game medium ID, character ID, etc.). In addition, in the first game, variation widths and/or types of parameter associated with the raising game medium can be set so as to differ depending on the race type. This allows the player to obtain his/her desired raising results according to the player's selection of the race type.

In the case where the first game is not associated with a goal achievement condition, the first-process execution unit 251 executes the first game on the basis of parameters associated with the raising game medium (e.g., ability parameters related to abilities), changes parameters associated with the raising game medium, and increments a current turn parameter indicating the current turn. Note that the first-process execution unit 251 can identify the association between a first game and a goal achievement condition by referring to the goal-achievement-condition management table.

In addition, in the case where the first game selected by the player is associated with a goal achievement condition, the first-process execution unit 251 changes a parameter associated with the player on the basis of the result of a decision that indicates whether or not that goal achievement condition has been achieved and that is made by the goal-achievement-condition decision unit 256. The parameter associated with the player can include at least either a turn-upper-limit parameter indicating the upper limit number of turns or a parameter associated with the raising game medium. In this embodiment, the parameter associated with the player is the turn-upper-limit parameter.

That is, regardless of whether or not the first game is associated with a goal achievement condition, the first-process execution unit 251 changes ability parameters of the raising game medium (raising parameters) and the current turn parameter when the first game is executed. The variation width of an ability parameter is determined by the first-process execution unit 251 on the basis of the ability parameter of the raising game medium at the time the execution of the first game is started and/or on the basis of the result of execution of the first game (e.g., finish place of the raising game medium in the race), and the ability parameter is thus changed. The determination of this variation width can be obtained through, for example, a game process that is programmed in advance as a process of the first game. In addition, the change in the current turn parameter is a change for increasing that parameter by one.

In addition, in the case where the first game is associated with a goal achievement condition and the goal-achievement-condition decision unit 256 decides that the goal achievement condition has been achieved, the first-process execution unit 251 increases the turn-upper-limit parameter as a reward. The amount of an increase in the turn-upper-limit parameter includes the difference between the turn associated with the achieved goal achievement condition and a turn that comes after the turn associated with the achieved goal achievement condition and that is associated with a goal achievement condition. In other words, the player can continue the raising game from the turn in which the first game has been executed to at least the turn associated with the next goal achievement condition. The amount of this increase can be changed as appropriate and may be mapped to, for example, the grade of the race in the first game.

On the other hand, in the case where the first game is associated with a goal achievement condition and the goal-achievement-condition decision unit 256 decides that the goal achievement condition has not been achieved, the first-process execution unit 251 executes a raising game end process for ending the raising game. The raising game end process may include an indication informing the player that the raising game will end. In this case, the display control unit 25*a* can display the aforementioned indication on the display device 13.

In the case where the raising command choice selected by the player is related to the second process, the second-process execution unit 252 executes the second process, thereby changing parameters (raising parameters) associated with the raising game medium and the current turn parameter. The second process is a process related to training. A specific example of a change in the raising parameter will be described below. The change in the current turn parameter is a change for increasing that parameter by one.

Figure 8:
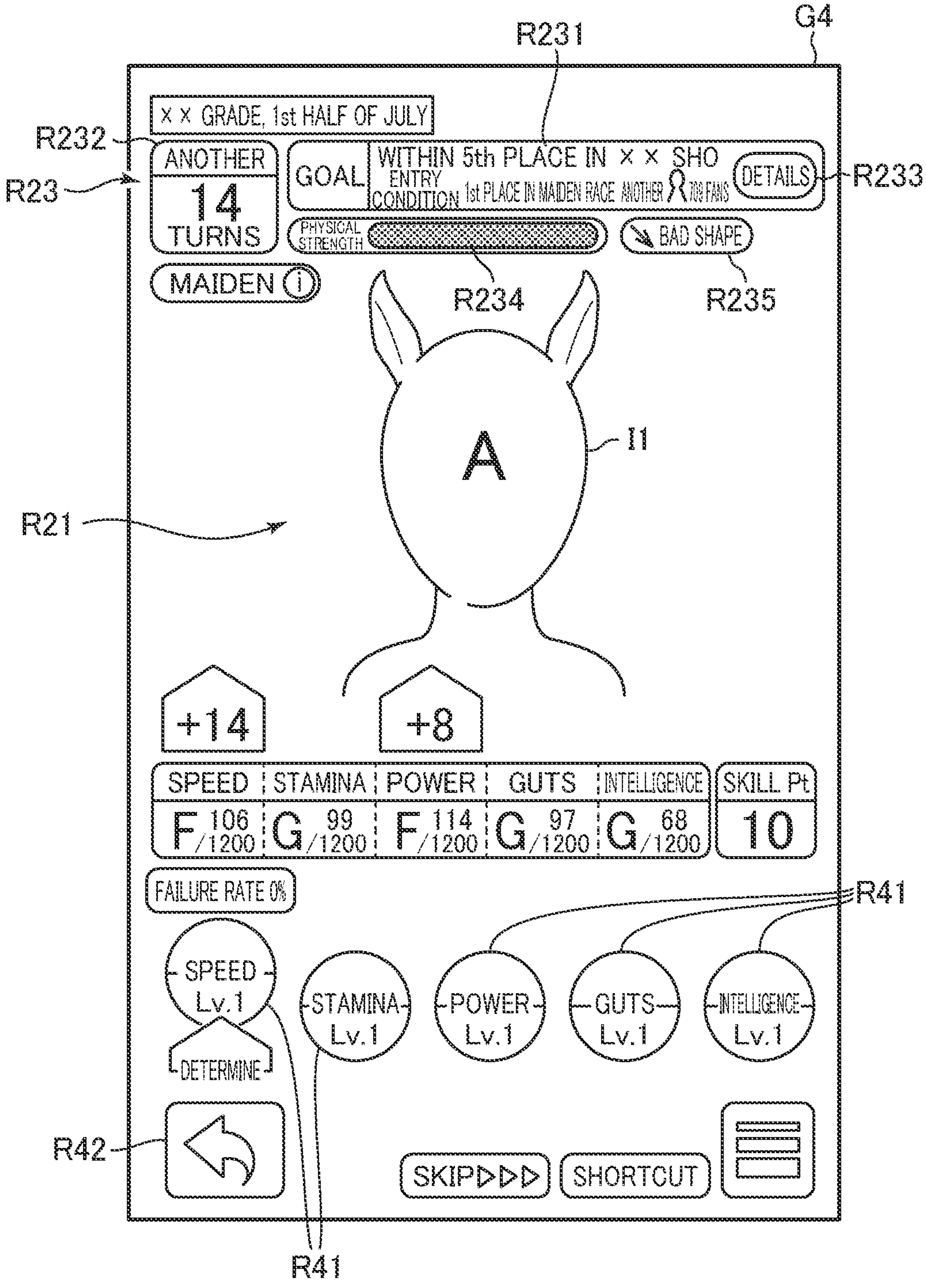
FIG. 8 is an example of a training command selection screen.

FIG. 8 is a training command selection screen. The training command selection screen G4 is a screen that is used to train the raising game medium in the raising game and to which the raising-command-choice selection screen G2 has transitioned. That is, the display control unit 25*a* accepts the selection of the second raising command choice R222 made by the player on the raising-command-choice selection screen G2 and displays the training command selection screen G4 on the display device 13.

The image I1 of the raising game medium, raising parameters, training command buttons R41, and a return button R42 are displayed on the training command selection screen G4. As the raising parameters: basic ability parameters indicating the speed, stamina, power, guts, and intelligence; skill points (skill pt) used to gain a skill; and a consumption-type parameter indicating the physical strength of the raising game medium are displayed.

Here, the training command buttons R41 are buttons for increasing the raising parameters corresponding to the basic ability parameters, and the second-process execution unit 252 changes the parameter corresponding to the selected training command button R41. In an example, the player pressing a training command button R41 causes the same type of raising parameter as that of the pressed button R41 to increase. For example, the raising parameter indicating the speed is increased by a predetermined amount by pressing the training command button R41 for speed. In addition, the number of raising parameters that are increased with one training command button R41 may be two or more. For example, in the example shown in FIG. 8, the training command button R41 for speed causes the raising parameters indicating the speed and power to be increased by predetermined amounts of +14 and +8, respectively. Pressing a training command button R41 may cause a consumption-type parameter to be changed, such as reducing the consumption-type parameter indicating the physical strength and increasing the consumption-type parameter indicating the skill. A failure rate of training shown in FIG. 8 is determined by the second-process execution unit 252, depending on the consumption-type parameter indicating the physical strength. In an example, the larger the value of the consumption-type parameter indicating the physical strength, the lower the failure rate and the easier it is to obtain a predetermined variation amount, and the smaller the value of the same parameter, the higher the failure rate and the more difficult it is to obtain a predetermined variation amount. The consumption-type parameter indicating the physical strength can be recovered with a rest (i.e., execution of the third process executed by the third-process execution unit 253 as a result of the player selecting the third raising command choice R223) of the raising game medium. The number of times training is performed during the raising game can be a predetermined number of times (e.g., once) in a predetermined period (e.g., one turn) in a scenario of the raising game. The return button R42 is a button for returning to the raising-command-choice selection screen G2 and causes a transition from the training command selection screen G4 to the raising-command-choice selection screen G2 by means of the display control unit 25*a*.

Note that although the character ID and the raising parameters of the raising game medium are managed separately from each other in this embodiment, the character ID and the raising parameters can be made to appear as if associated with each other as a result of the raising-game execution unit 25*b* displaying both the image I1 associated with the character ID and the raising parameters on the training command selection screen G4.

In the case where the raising command choice selected by the player is related to the third process, the third-process execution unit 253 executes the third process, thereby changing a parameter (raising parameter) associated with the raising game medium and the current turn parameter. The third process is a process related to rest. The raising parameter to be changed is the consumption-type parameter indicating the physical strength of the raising game medium. In an example, the third-process execution unit 253 increases the consumption-type parameter indicating the physical strength by a predetermined amount. The larger the consumption-type parameter indicating the physical strength, the better impact is exerted on the training effect. That is, through the execution of the third process, the player can enhance the training efficiency. The change in the current turn parameter is a change for increasing that parameter by one.

In the case where the raising command choice selected by the player is related to the fourth process, the fourth-process execution unit 254 executes the fourth process, thereby changing a parameter (raising parameter) associated with the raising game medium and the current turn parameter. The fourth process is a process related to treatment. The raising game of this embodiment may be implemented such that a failure of the raising game medium occurs in the second process related to training and/or the first game related to a race. For example, if training is selected when the consumption-type parameter indicating the physical strength is low, a failure could occur in the raising game medium. A failure of the raising game medium corresponds to the failure parameter, which is one of the consumption-type parameters. In other words, the failure parameter changes as a result of the execution unit 251 or 252 executing the first game or the second process according to the value of the consumption-type parameter indicating the physical strength. In an example, the failure parameter can be mapped to a larger value as the failure becomes severer, such as 1, 2, 3, 4, and so on, starting with the state of no failure and increasing from a milder state to a severer state. The fourth process is a process for recovering the failure parameter to 1 or close to 1. The change in the current turn parameter is, for example, a change for increasing that parameter by one. In another example, the change in the current turn parameter may be a change for increasing that parameter by two or more.

In the case where the raising command choice selected by the player is related to the fifth process, the fifth-process execution unit 255 executes the fifth process, thereby changing a parameter (raising parameter) associated with the raising game medium and the current turn parameter. The fifth process is a process related to biorhythm. The raising game of this embodiment may be implemented such that as the motivation parameter, which is one of the consumption-type parameters, becomes larger: the player can win the race more easily (finish the goal faster or win a higher finish place) in the case of the first game; and the player can experience a more profound training effect, i.e., a larger amount of increase in a raising parameter in the case of the second process. The motivation parameter can be configured such that numerical values are mapped to the states of the motivation, such as assigning 1, 2, 3, 4, and 5 to great shape, good shape, normal, bad shape, and very bad shape, respectively. That is, the fifth process is a game for recovering the motivation parameter to 1 or close to 1. The change in the current turn parameter is a change for increasing that parameter by one.

In the case where a first game is associated with a goal achievement condition, the goal-achievement-condition decision unit 256 decides whether or not the goal achievement condition has been achieved on the basis of the result of execution of that first game. More specifically, the goal-achievement-condition decision unit 256 acquires, from the first-process execution unit 251, the race ID of the first game and the result of execution of the first game (e.g., finish place of the raising game medium in the race) and decides whether or not the goal achievement condition has been achieved by referring to the goal-achievement-condition management table.

For example, in the case where the goal achievement condition is the place-winning goal, the result of execution of the first game includes a race-place parameter indicating the finish place in the race, and the goal-achievement-condition decision unit 256 decides whether or not the race-place parameter is equal to or smaller than the achievement condition parameter. In the case where the race-place parameter is equal to or smaller than the achievement condition parameter, the goal-achievement-condition decision unit 256 decides that the goal achievement condition has been achieved. In the case where the race-place parameter exceeds the achievement condition parameter, the goal-achievement-condition decision unit 256 decides that the goal achievement condition is not achieved. If this is the case, in this embodiment, the raising-game execution unit 25*b* executes the raising game end process for ending the raising game. Note that a decision as to whether or not the race in the first game is a target race associated with a goal achievement condition may be made by the goal-achievement-condition decision unit 256 or by the first-process execution unit 251. This decision can be made by deciding, on the basis of, for example, the goal-achievement-condition management table, whether or not the race ID of the first game coincides with the target race ID for the goal achievement condition associated with the current turn.

In the case where the goal achievement condition is the predetermined-number-of-times place-winning goal, the goal-achievement-condition decision unit 256 decides whether or not the race-place parameter included in the result of execution of the first game is equal to or smaller than the achievement condition parameter indicating a finish place in the race. In the case where the race-place parameter is equal to or smaller than the achievement condition parameter indicating a finish place in the race, the goal-achievement-condition decision unit 256 increases a target-place-achievement-number parameter by one and compares this increased target-place-achievement-number parameter with the achievement condition parameter indicating the number of times. In the example shown in FIG. 7, the achievement condition parameter indicating the number of times is "2" in the parameter corresponding to "goal achievement condition 2", and the goal-achievement-condition decision unit 256 compares this parameter with the increased target-place-achievement-number parameter and decides that the goal achievement condition has been achieved if the two parameters match. On the other hand, if the two parameters do not match, the goal-achievement-condition decision unit 256 decides that the goal achievement condition is not achieved and causes the raising-game execution unit 25*b* to execute the raising game end process as described above. Note that the target-place-achievement-number parameter is a parameter that is associated with the player, the raising game, or the raising game medium and that indicates the number of times the condition of the player winning within a predetermined finish place in a race of a predetermined or higher grade is achieved. The target-place-achievement-number parameter may be incremented by the first-process execution unit 251 and stored in the storage device 14 each time the condition is achieved.

In the case where the goal achievement condition is the fan-number-gaining-goal-achievement condition, the goal-achievement-condition decision unit 256 reads, from the storage device 14, a gained-fan-number parameter indicating the number of fans that have been gained so far, increases the read gained-fan-number parameter by the number of fans newly gained by the first game included in the result of execution of the first game, and stores this parameter in the storage device 14. In addition, the goal-achievement-condition decision unit 256 decides whether or not the increased gained-fan-number parameter is equal to or larger than the achievement condition parameter that is obtained by referring to the goal-achievement-condition management table and that indicates the number of fans, thus deciding that the goal achievement condition has been achieved in the case where the increased gained-fan-number parameter is equal to or larger than the achievement condition parameter. On the other hand, in the case where the increased gained-fan-number parameter is smaller than the achievement condition parameter, the goal-achievement-condition decision unit 256 decides that the goal achievement condition is not achieved and causes the raising-game execution unit 25*b* to execute the raising game end process as described above. Alternatively, it is also acceptable to continue the raising game by proceeding to the next turn. Note that a calculation for increasing the gained-fan-number parameter may be performed by the first-process execution unit 251.

In a predetermined turn during the raising game, the goal-achievement-condition determination unit 257 determines, on the basis of a predetermined condition, a goal achievement condition associated with a turn subsequent to the predetermined turn. This determination is made in the case where all goal achievement conditions are associated with the raising game medium in advance or in the case where only some goal achievement conditions are associated with the raising game medium in advance. That is, in either the former case or the latter case, every goal achievement condition is associated with any turn and the raising game medium, and a target race is associated with each of the goal achievement conditions in the former case, whereas a target race is associated with only some goal achievement conditions (no target races are associated with the rest of the goal achievement conditions) in the latter case. That is, in the former case, the goal-achievement-condition determination unit 257 changes, in a predetermined turn, the target race preset in another subsequent turn to a different race, whereas, in the latter case, the goal-achievement-condition determination unit 257 determines, in a predetermined turn, a target race in a turn subsequent to the predetermined turn.

More specifically, in a predetermined turn, the goal-achievement-condition determination unit 257 changes the predetermined next goal achievement condition to a different goal achievement condition on the basis of the player's selection of a first game associated with a goal achievement condition or a predetermined parameter value associated with the raising game medium. For example, when the first raising command choice R221 is selected by the player on the raising-command-choice selection screen G2 in a predetermined turn and subsequently one of a plurality of races is selected on the race selection screen, the goal-achievement-condition determination unit 257 acquires this selection via the display control unit 25*a*. The goal-achievement-condition determination unit 257 determines that the target race for the closest goal achievement condition after that predetermined turn should be changed to the selected race. For example, there are two choices for the first game, and the two choices are assigned 1 and 2, respectively, as the target-race determination parameters in the goal-achievement-condition management table. The goal-achievement-condition determination unit 257 identifies a target-race determination parameter from the choice selected by the player, identifies the race corresponding to this target-race determination parameter by referring to the goal-achievement-condition management table, and determines that race as a target race. Note that the goal-achievement-condition management table may store information concerning the race corresponding to the target-race determination parameter in a predetermined storage location in the memory of the storage device 14 and map that storage location to the target-race determination parameter.

In addition, in a predetermined turn, the goal-achievement-condition determination unit 257 determines a target race on the basis of the motivation parameter associated with the raising game medium and sets that target race as a target race for the next goal achievement condition. For example, the goal-achievement-condition determination unit 257 determines a race of a higher grade as a target race if the motivation parameter is equal to or larger than a predetermined value (e.g., great shape, good shape) and determines a race of a lower grade as a target race if the motivation parameter is smaller than the predetermined value (e.g., bad shape, very bad shape). For example, in turn 34 for a character C in the example shown in FIG. 7, the target-race determination parameter is assigned 1 in the goal-achievement-condition management table if the motivation parameter is equal to or larger than the predetermined value and is assigned 2 if the motivation parameter is smaller than the predetermined value. The goal-achievement-condition determination unit 257 identifies, from the motivation parameter, a target-race determination parameter corresponding to the motivation parameter, identifies the race corresponding to the target-race determination parameter by referring to the goal-achievement-condition management table, and determines that race as a target race.

Figure 9:
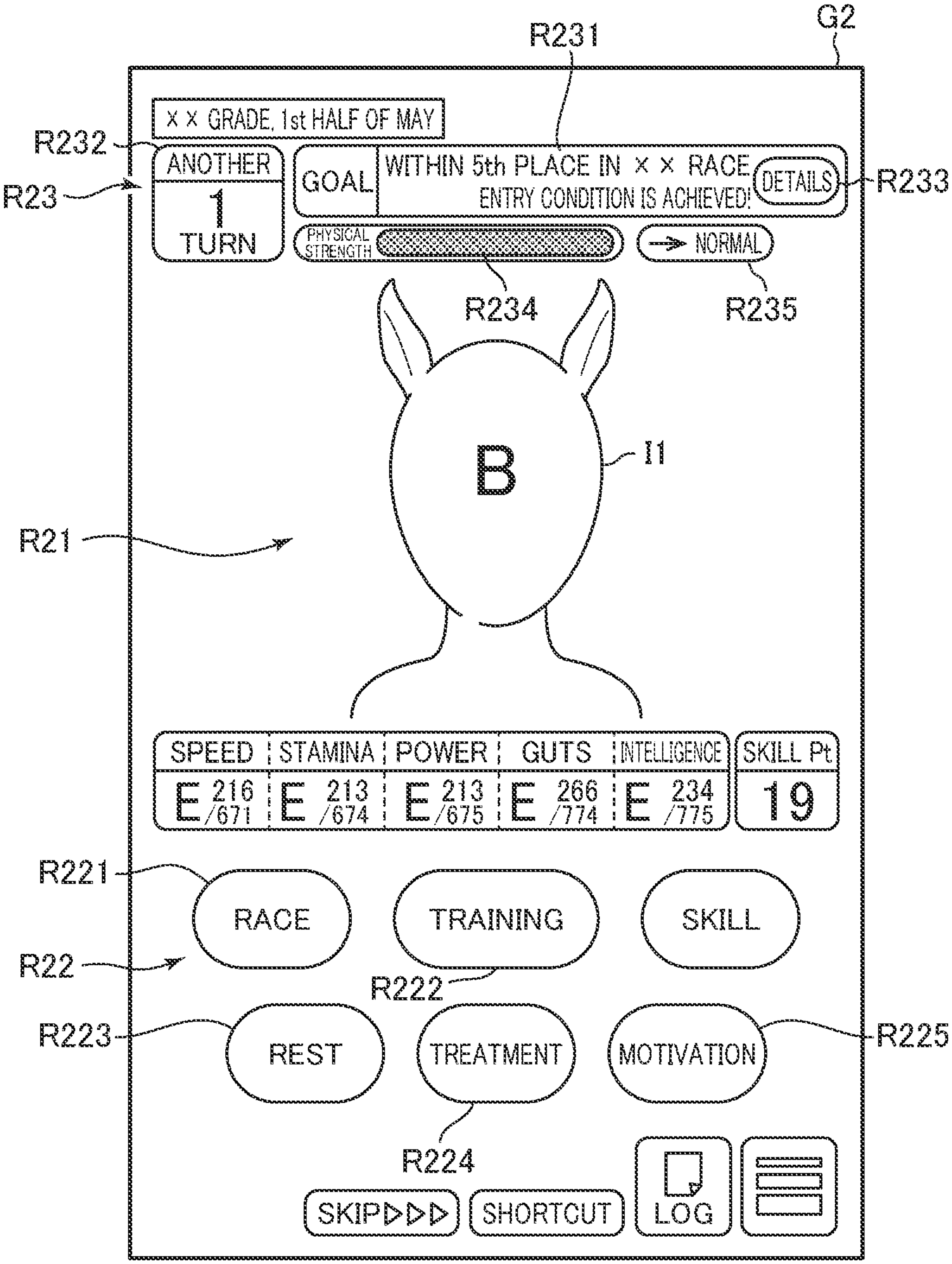
FIG. 9 is an example of the raising-command-choice selection screen before the next goal achievement condition is changed.
Figure 10:
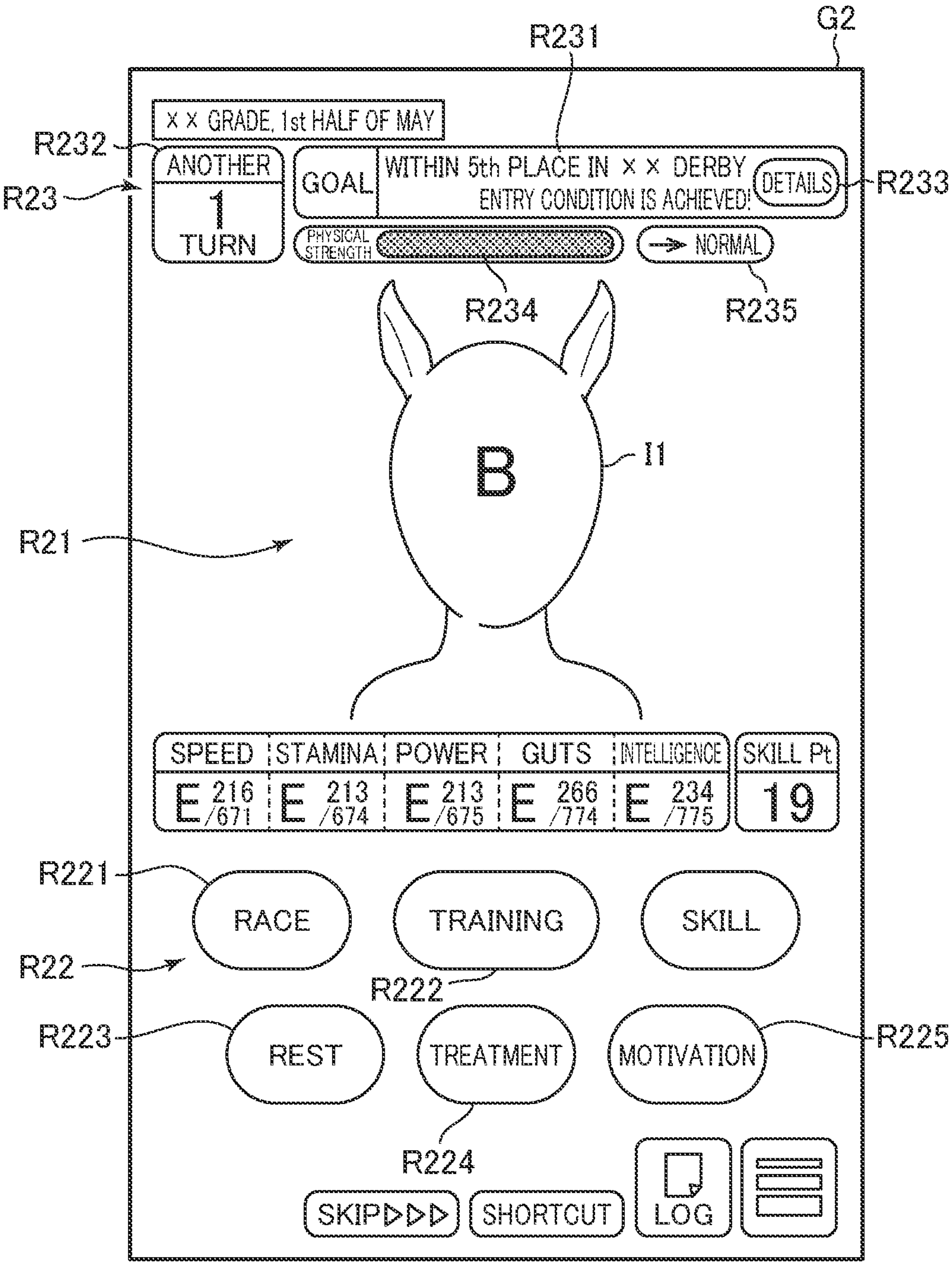
FIG. 10 is an example of the raising-command-choice selection screen after the next goal achievement condition is changed.
Figure 11:
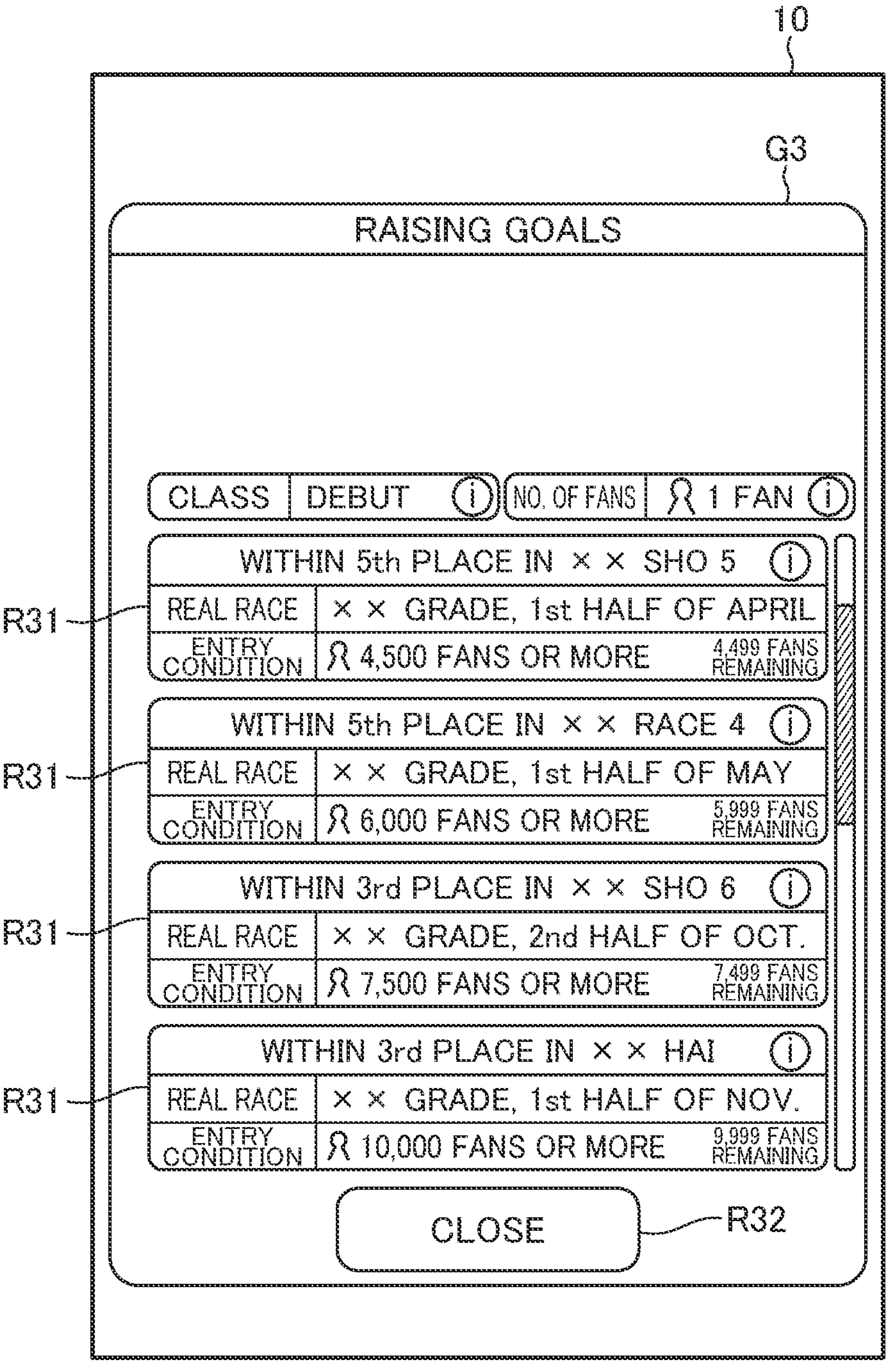
FIG. 11 is an example of the goal-achievement-condition detailed screen before the next goal achievement condition is changed.
Figure 12:
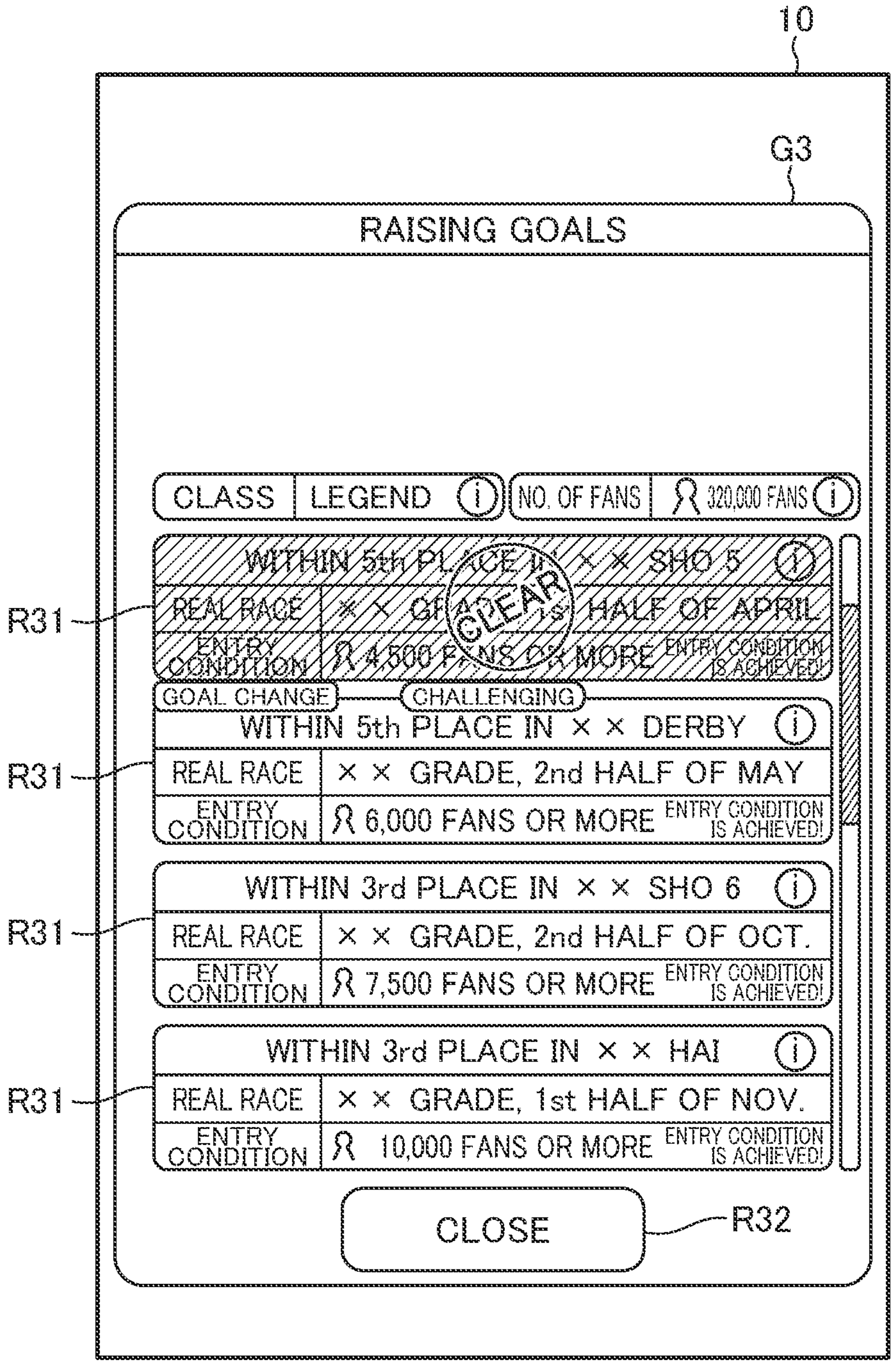
FIG. 12 is an example of the goal-achievement-condition detailed screen after the next goal achievement condition is changed.

FIG. 9 is an example of the raising-command-choice selection screen before the next goal achievement condition is changed. FIG. 10 is an example of the raising-command-choice selection screen after the next goal achievement condition is changed. FIG. 11 is an example of the goal-achievement-condition detailed screen before the next goal achievement condition is changed. FIG. 12 is an example of the goal-achievement-condition detailed screen after the next goal achievement condition is changed.

In the examples shown in FIGS. 9 and 10, it can be confirmed that the target race displayed in the goal-achievement-condition display region R23 is changed from "xx race", which is the race before being changed, to "xx derby".

That is, as shown in FIGS. 9 and 11, the display control unit 25*a* displays, on the raising-command-choice selection screen G2 and the goal-achievement-condition detailed screen G3, the name of a predetermined target race associated with the goal achievement condition until the target race is changed. When the target race is changed by the goal-achievement-condition determination unit 257, the display control unit 25*a*, as shown in FIGS. 10 and 12, changes, to the changed target race, the indication of the target race to be displayed in the goal-achievement-condition display region R23 on the raising-command-choice selection screen G2 and in the goal-achievement-condition indication R31 on the goal-achievement-condition detailed screen G3. This allows the player to be notified of the change in the target race and thus prompted to reconsider a raising strategy. Along with a change in the target race, the display control unit 25*a* may display the goal-achievement-condition display region R23 and/or the goal-achievement-condition indication R31 in a different background color so as to be noticeable, display the goal-achievement-condition display region R23 and/or the goal-achievement-condition indication R31 so as to be enclosed with a bold line, or indicate that a target race has been determined with a text message.

In addition, in a predetermined turn, the goal-achievement-condition determination unit 257 may determine the next goal achievement condition associated with a turn subsequent to the predetermined turn by a lottery process. More specifically, in a predetermined turn, the goal-achievement-condition determination unit 257 determines a target race for the next goal achievement condition by a lottery process. This determination can be made regardless of whether a target race for the next goal achievement condition has been predetermined or not. In the case where no target races are predetermined, it is assumed that the turn in which a target race is determined is a turn associated with a goal achievement condition just before the next goal achievement condition. This is to display the next goal achievement condition in the goal-achievement-condition display region R23 in the subsequent turns. Here, explanations will be given by way of an example where no target races are associated in advance.

Figure 13:
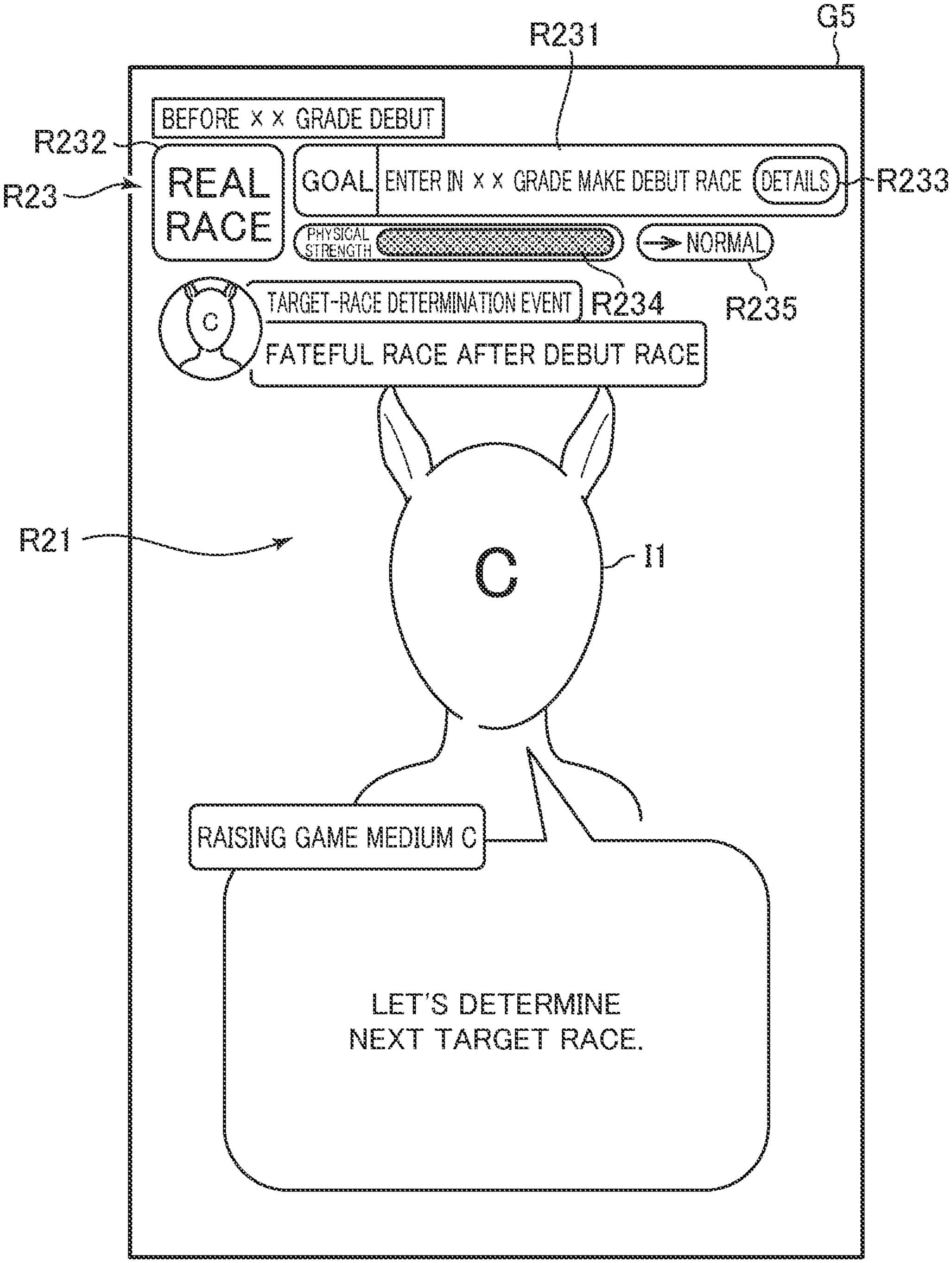
FIG. 13 is an example of a target-race determination event screen before the next goal achievement condition is determined.
Figure 14:
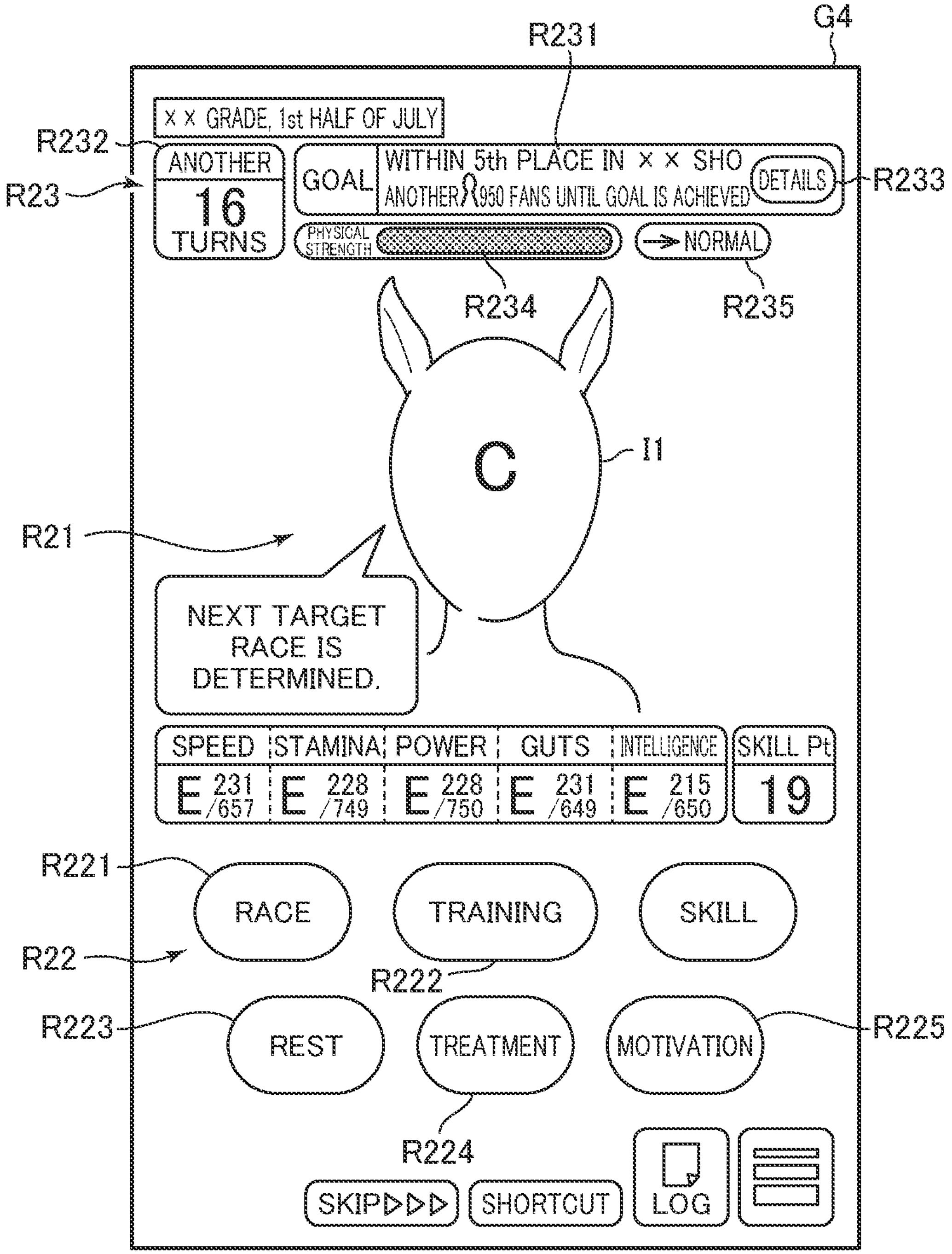
FIG. 14 is an example of the raising-command-choice selection screen after the next goal achievement condition is determined.
Figure 15:
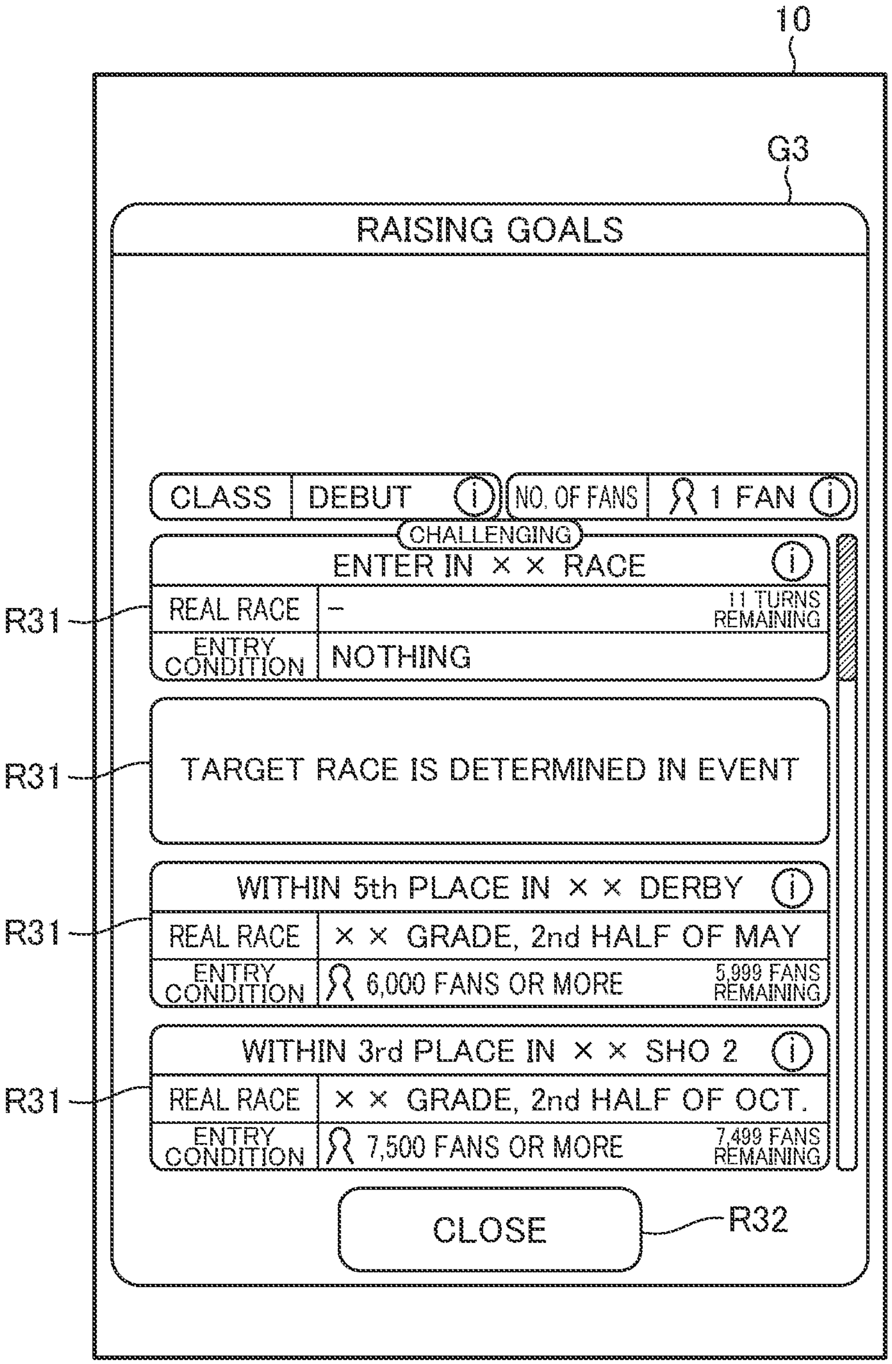
FIG. 15 is an example of the goal-achievement-condition detailed screen before the next goal achievement condition is determined.
Figure 16:
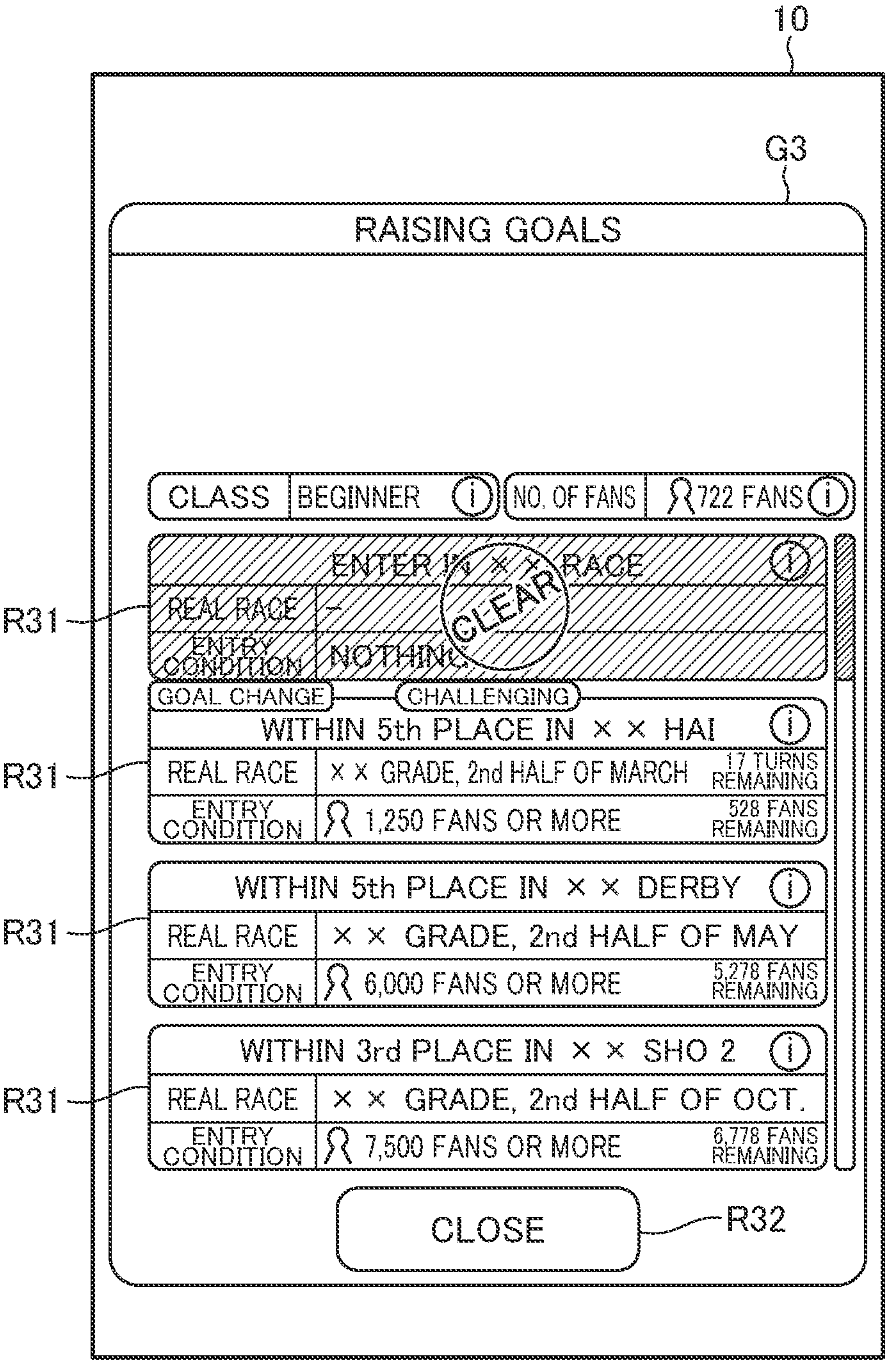
FIG. 16 is an example of the goal-achievement-condition detailed screen after the next goal achievement condition is determined.

FIG. 13 is an example of the target-race determination event screen before the next goal achievement condition is determined. FIG. 14 is an example of the raising-command-choice selection screen after the next goal achievement condition is determined. FIG. 15 is an example of the goal-achievement-condition detailed screen before the next goal achievement condition is determined. FIG. 16 is an example of the goal-achievement-condition detailed screen after the next goal achievement condition is determined.

As shown in FIG. 13, when the lottery process is to be performed, the goal-achievement-condition determination unit 257 may execute a target race determination event. The goal-achievement-condition determination unit 257 outputs the result of this execution to the display control unit 25*a*, and the display control unit 25*a* displays, on the basis of the result of this execution, the target-race determination event screen G5 as the target race determination event on the display device 13. Display of this event is a presentation of the lottery process and can be a scene on which the character of the raising game medium draws a written fortune or has his/her fortune told.

In addition, the display control unit 25*a* displays the remaining-turn-number indication R232 on the target-race determination event screen G5 so as to indicate that the current turn is a turn associated with a goal achievement condition. The lottery process is executed by the goal-achievement-condition determination unit 257 after a target race for a goal achievement condition is executed in the turn associated with the target race and before that turn proceeds to the next turn. Therefore, the current turn displayed in the remaining-turn-number indication R232 can be, for example, "0" or "real race", as shown in FIG. 13.

In the case where the next target race is not determined, the next-goal-achievement-condition indication R231 corresponding to the next target race may be grayed out, and a message indicating that a target race is determined in the target race determination event may be displayed, on the goal-achievement-condition detailed screen G3, as shown in FIG. 15. This indication is displayed by the display control unit 25*a* on the display device 13.

In the case where the next target race is not determined, the goal-achievement-condition determination unit 257 determines the next target race in a turn that is associated with a target race and that is just before the turn associated with the next goal achievement condition. For example, if a goal achievement condition is associated with the 10th turn and the 20th turn, a target race is preset in the 10th turn, and no target races are preset in the 20th turn, then the goal-achievement-condition determination unit 257 determines a target race for the 20th turn after the execution of the target race in the 10th turn. The target race in the goal-achievement-condition display region R23 displayed on the target-race determination event screen G5 is the target race in the current turn. In addition, as shown in FIG. 13, the display control unit 25*a* may display words of the raising game medium until the next target race is determined.

When the next target race is determined, for example, the first-process execution unit 251 advances the turn, and the display control unit 25*a* sets, as shown in FIGS. 14 and 16, the determined target race as the next target race to be displayed in the next-goal-achievement-condition indication R231 on the raising-command-choice selection screen G2 and in the goal-achievement-condition indication R31 on the goal-achievement-condition detailed screen G3. This allows the player to be notified that a target race is determined and thus prompted to reconsider a raising strategy. Along with determination of a target race, the display control unit 25*a* may display the goal-achievement-condition display region R23 and/or the goal-achievement-condition indication R31 in a different background color so as to be noticeable, display the goal-achievement-condition display region R23 and/or the goal-achievement-condition indication R31 so as to be enclosed with a bold line, or indicate that a target race has been determined with a text message.

Operation

Figure 17:
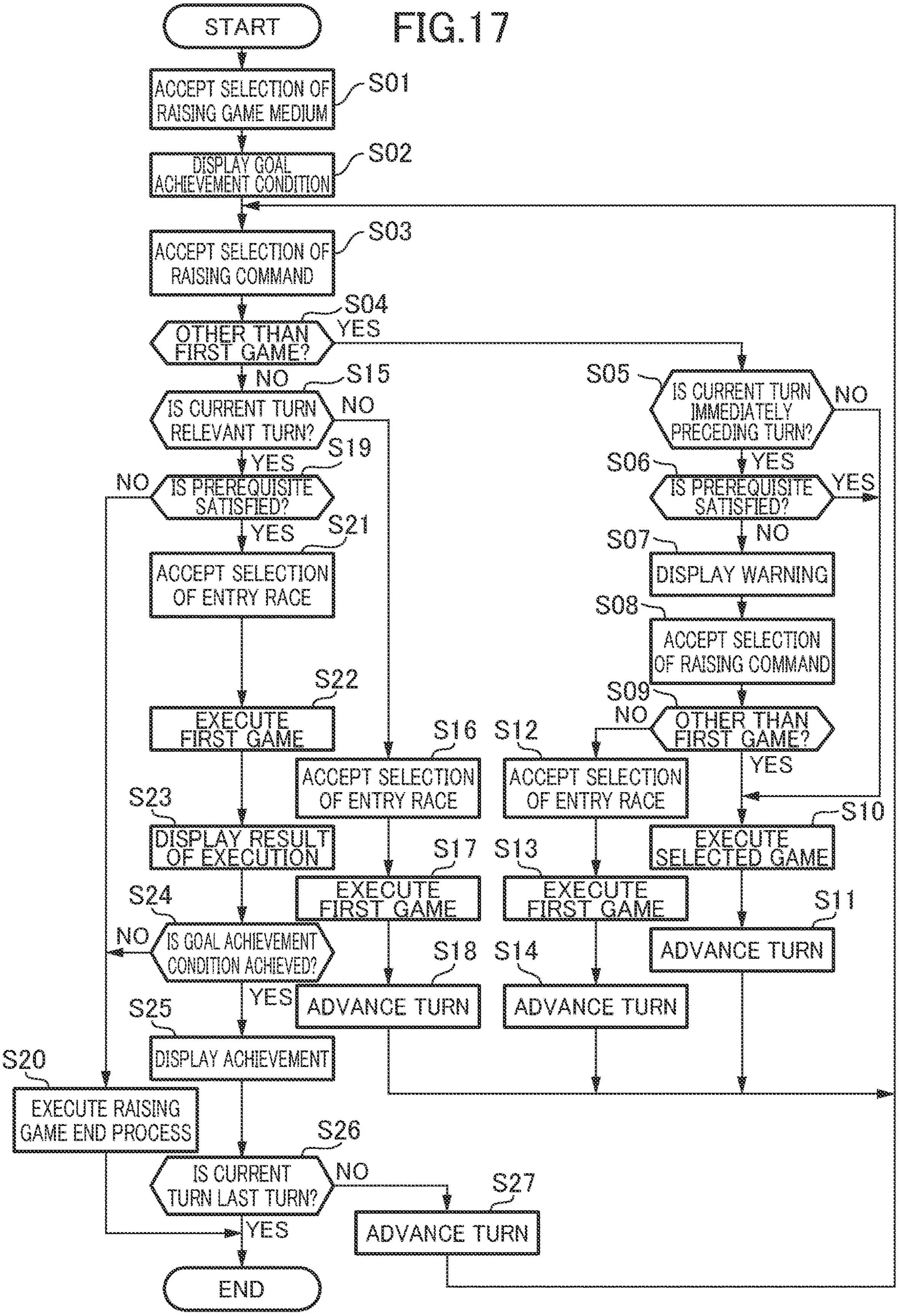
FIG. 17 is an example of a flowchart for the operation of the electronic device according to an embodiment of the present invention.

FIG. 17 is an example of an operation flowchart of the electronic device according to an embodiment of the present invention. Here, explanations will be given by way of an example where a prerequisite is set in a goal achievement condition.

As shown in FIG. 17, the electronic device 10 causes the display control unit 25*a* to display the raising-game-medium selection screen G1 on the display device 13 and accepts selection of a raising game medium made by the player via the input device 12 (S01: Accept selection of raising game medium). The electronic device 10 stores the ID of the selected raising game medium and the player ID in the storage device 14 in association with each other.

Next, the raising-game execution unit 25*b* starts a raising game for the selected raising game medium. More specifically, the display control unit 25*a* first displays, on the display device 13, the raising-command-choice selection screen G2 for the first turn, including a goal achievement condition (e.g., next goal achievement condition) (S02: Display goal achievement condition), and accepts selection of a raising command choice made by the player from the plurality of raising command choices R221 to R225 (S03: Accept selection of raising command choice).

The raising-game execution unit 25*b* decides whether or not the selected raising command choice is other than the first game (race game, here) (S04: Other than first game?). More specifically, the raising-game execution unit 25*b* decides whether or not the raising command choice selected by the player is the first raising command choice R221 corresponding to the first game. If the selected raising command choice is other than the first game (YES in S04), the raising-game execution unit 25*b* decides whether or not the current turn is a turn just before the turn associated with the next goal achievement condition (hereinafter, also referred to as an "immediately preceding turn") (S05: Is current turn immediately preceding turn?).

If the current turn is the immediately preceding turn (YES in S05), the raising-game execution unit 25*b* (or the goal-achievement-condition decision unit 256) decides whether or not the prerequisite associated with the next goal achievement condition is satisfied (S06: Is prerequisite satisfied?).

If the prerequisite is not satisfied (NO in S06), the display control unit 25*a* displays a warning dialog (not shown in the figure) on the display device 13 (S07: Display warning). The warning dialog is an indication that notifies the player that the prerequisite is not satisfied and prompts the player to select the raising command choice for the first game in the current turn in order to satisfy the prerequisite. For example, if a raising command choice other than the first game is selected on the raising-command-choice selection screen G2, it is possible to display a pop-up on the raising-command-choice selection screen G2. The prerequisite here includes, for example, entering a predetermined race and/or gaining a predetermined number of fans.

After the warning dialog is closed, the display control unit 25*a* displays the raising-command-choice selection screen G2 again and accepts selection of a raising command choice made by the player (S08: Accept selection of raising command choice).

The raising-game execution unit 25*b* decides whether or not the selected raising command choice is other than the first game (S09: Other than first game?). If the selected raising command choice is other than the first game (YES in S09), then one of the second to fifth process execution units 252 to 255 corresponding to the selected raising command choice executes the corresponding one of the second to fifth processes (S10: Execute selected game), changes parameters associated with the raising game medium, displays, on the display device 13, a result of the execution including parameter variation widths or changed parameters, and advances the turn by incrementing the turn parameter (S11: Advance turn). After the turn is advanced, the flow returns to acceptance of the selection of a raising command choice in S03.

On the other hand, if the selected raising command choice is the first game (NO in S09), the display control unit 25*a* displays a multiple-race selection screen on the display device 13 and accepts selection of a race made by the player via the input device 12 (S12: Accept selection of entry race). The first-process execution unit 251 executes the first game on the basis of this selection (S13: Execute first game), changes parameters associated with the raising game medium, displays, on the display device 13, a result of the execution including parameter variation widths or changed parameters and the finish place in the race, and advances the turn by incrementing the turn parameter (S14: Advance turn). Note that the first-process execution unit 251 determines the number of gained fans on the basis of the result of execution of the first game (e.g., finish place in the race), increases the fan-number parameter by the determined number of fans, and stores the increased fan-number parameter in the storage device 14. After the turn is advanced, the flow returns to acceptance of the selection of a raising command choice in S03.

If the current turn is not the immediately preceding turn (NO in S05) and the prerequisite is satisfied (YES in S06), then one of the second to fifth process execution units 252 to 255 corresponding to the selected raising command choice executes the corresponding one of the second to fifth processes (S10: Execute selected game), changes parameters associated with the raising game medium, displays, on the display device 13, a result of the execution including parameter variation widths or changed parameters and the finish place in the race, and advances the turn by incrementing the turn parameter (S11: Advance turn). After the turn is advanced, the flow returns to acceptance of the selection of a raising command choice in S03.

If the selected raising command choice is not other than the first game (NO in S04), the raising-game execution unit 25*b* (or the goal-achievement-condition decision unit 256) decides whether or not the current turn is the relevant turn associated with a goal achievement condition (S15: Is current turn relevant turn?).

If the current turn is not the relevant turn (NO in S15), the display control unit 25*a* displays the race selection screen and accepts selection of a race made by the player (S16: Accept selection of entry race). The first-process execution unit 251 executes the first game on the basis of this selection (S17: Execute first game), changes parameters associated with the raising game medium, displays, on the display device 13, a result of the execution including parameter variation widths or changed parameters and the finish place in the race, and advances the turn by incrementing the turn parameter (S18: Advance turn). Note that the first-process execution unit 251 determines the number of gained fans on the basis of the result of execution of the first game, increases the fan-number parameter by the determined number of fans, and stores the increased fan-number parameter in the storage device 14. After the turn is advanced, the flow returns to acceptance of the selection of a raising command choice in S03.

If the current turn is the relevant turn (YES in S15), the raising-game execution unit 25*b* (or the goal-achievement-condition decision unit 256) decides whether or not the prerequisite associated with the relevant goal achievement condition is satisfied (S19: Is prerequisite satisfied?). If the prerequisite is not satisfied (NO in S19), the raising-game execution unit 25*b* executes the raising game end process (S20: Execute raising game end process) to end the raising game.

If the prerequisite is satisfied (YES in S19), the display control unit 25*a* displays the race selection screen and accepts selection of a race made by the player (S21: Accept selection of entry race). The type of race displayed on the race selection screen at this time is only the target race included in the goal achievement condition associated with the current turn. Thereafter, the first-process execution unit 251 executes the first game on the basis of this selection (S22: Execute first game), changes parameters associated with the raising game medium, and causes the display control unit 25*a* to display, on the display device 13, a result of the execution including parameter variation widths or changed parameters and the finish place in the race (S23: Display result of execution).

Then, because the first game is associated with the goal achievement condition, the goal-achievement-condition decision unit 256 decides whether or not the goal achievement condition is achieved on the basis of the result of execution of the first game (S24: Is goal achievement condition achieved?). If it is decided that the goal achievement condition is not achieved (NO in S24), the flow proceeds to S20, where the raising game end process is executed to end the raising game.

On the other hand, if it is decided that the goal achievement condition is achieved (YES in S24), the display control unit 25*a* displays, on the display device 13, an achievement display screen indicating that the goal achievement condition is achieved (S25: Display achievement). Also, the first-process execution unit 251 changes a parameter associated with the player on the basis of the result of decision made by the goal-achievement-condition decision unit 256. Here, the result of decision for changing the parameter associated with the player is achievement of the goal achievement condition. The parameter associated with the player is the turn-upper-limit parameter indicating the upper limit number of turns. In an example, the increase in the turn-upper-limit parameter can include the difference between the current turn associated with the achieved goal achievement condition and a turn associated with a goal achievement condition after the current turn. In other words, the player can continue the raising game from the turn in which the first game is executed until at least the turn associated with the next goal achievement condition.

After the achievement display screen is displayed, the raising-game execution unit 25*b* (or the first-process execution unit 251) decides whether or not the current turn is the last turn in which the raising game ends (S26: Is current turn last turn?). More specifically, the raising-game execution unit 25*b* (or the first-process execution unit 251) decides whether or not the turn parameter indicating the current turn corresponds to the maximum value (fixed value) of the turn-upper-limit parameter. If the turn parameter does not correspond to the maximum value of the turn-upper-limit parameter (NO in S26), the raising-game execution unit 25*b* (or the first-process execution unit 251) advances the turn by incrementing the turn parameter (S27: Advance turn), and the flow returns to acceptance of the selection of a raising command choice in S03. If the turn parameter corresponds to the maximum value of the turn-upper-limit parameter (YES in S26), the raising game ends.

In the example above, the raising-game execution unit 25*b* decides whether or not the current turn is the immediately preceding turn in S05. Without being limited to this example, however, the aforementioned decision can be made in a turn before the turn associated with the next goal achievement condition, such as the turn preceding by two turns from the turn associated with the next goal achievement condition.

Operation and Effect (1) The electronic device 10 according to this embodiment is an electronic device for executing a game including a raising game in which a game medium selected from a plurality of game media serves as a raising game medium, and a parameter associated with said raising game medium is changed through execution of at least one of a plurality of first games common among the plurality of game media, said electronic device having: the display control unit 25*a* for displaying, on the display device 13, in a turn constituting the raising game, the raising-command-choice selection screen G2 for accepting selection made by a player from a plurality of raising-related raising command choices including a raising command choice related to execution of the first game; and the raising-game execution unit 25*b* for executing the raising game on the basis of the raising command choice selected by the player in the turn, changing a parameter associated with the raising game medium, and advancing the turn. In order to assist the player in selecting the raising command choice, the display control unit 25*a* displays, on the display device 13, a goal achievement condition for the raising game medium, said goal achievement condition being set so as to be associated with the game media and being different for each of the game media. The raising-game execution unit 25*b* has the first-game execution unit 251 (first-process execution unit 251) for executing the first game in the case where the selected raising command choice is related to the first game and the goal-achievement-condition decision unit 256 for deciding, on the basis of a result of execution of the first game, whether or not the goal achievement condition has been achieved in the case where the first game and the goal achievement condition are associated, and the first-game execution unit 251 changes a parameter associated with the player on the basis of a result of decision made by the goal-achievement-condition decision unit 256.

Thus, even if a first game generated during the raising game is common between the raising game medium and another game medium (game medium serving as a candidate game medium to be raised), because different goal achievement conditions are set individually for each of the game media, the player can be given an opportunity to formulate diverse raising strategies for the purpose of deciding goal achievement conditions, thus enjoying himself/herself with diverse raising courses. That is, in a raising game in which game media are raised through a first game common among all game media, the game media are likely to be raised according to the player's preference and hence easily lead to uniform or monotonous raising strategies, which will result in making the raising game boring. In contrast, in this embodiment, although the raising game medium is raised through a first game that can be common among all game media, the player can be given an opportunity to formulate raising strategies other than those based on the player's preference because goal achievement conditions that differ for each of the game media are set. That is, because goal achievement conditions differ for each of the game media, the player can be made to exhibit different raising behaviors naturally and hence can be presented with diverse raising experiences. In addition, it is possible to realize raising courses for fostering personal characters of the raising game medium by making goal achievement conditions different for each of the raising game media, such as associating goal achievement conditions with properties of the raising game media, thereby providing the player with the pleasure of expressing raising courses suitable for properties or personal characters of each of the raising game media. Furthermore, because the first game itself is at least one of the first games common among all game media, it is not necessary to provide each of the game media with an individual storyline that is specific to and tied with the game medium, making it easier for the game developer to manage a raising game in the development, changing, etc. of the raising game.

(2) The display control unit 25*a* displays, on the display device 13, in a certain turn not associated with the goal achievement condition, the next goal achievement condition associated with the earliest of at least one turn that comes after said certain turn and that is associated with the goal achievement condition.

Because of this, when selecting a raising command choice, the player can confirm the next goal achievement condition, and hence the player can select a raising command choice suitable for a raising strategy that is formulated for the purpose of deciding the goal achievement condition. Although the next goal achievement condition is displayed on the raising-command-choice selection screen G2 in this embodiment, it is also acceptable to cause the display control unit 25*a* to display the next goal achievement condition on the display device 13 when the player selects a raising game medium or when the raising game is started after the player has selected a raising game medium. It is also acceptable to cause the display control unit 25*a* to display the goal-achievement-condition detailed screen G3 on the display device 13 when the player selects a raising game medium or when the raising game is started after the player has selected a raising game medium.

(3) The display control unit 25*a* displays, on the display device 13, in a certain turn not associated with the goal achievement condition, the remaining number of turns until the turn associated with the next goal achievement condition, said remaining number being the difference between the certain turn and the earliest of at least one turn that comes after the certain turn and that is associated with the goal achievement condition.

Because of this, the player can grasp the number of turns until the turn associated with the next goal achievement condition. Therefore, the player can formulate a raising strategy for the purpose of achieving the next goal achievement condition.

(4) The display control unit 25*a* displays, on the display device 13, in a turn not associated with the goal achievement condition, a prerequisite for allowing the execution of a first game associated with the next goal achievement condition.

Because of this, the player can grasp a condition to be cleared before he/she can proceed to the next goal achievement condition. Therefore, the player can use this condition as reference information in formulating a raising strategy, such as setting this condition as a milestone of the raising strategy and adjusting the course of the raising strategy in light of the current raising situation of the raising game medium.

(5) The raising-game execution unit 25*b* advances the raising game to the next turn as a reward for achievement of the goal achievement condition in the case where the goal-achievement-condition decision unit 256 decides that the goal achievement condition has been achieved and executes a process for ending the raising game in the case where the goal-achievement-condition decision unit 256 decides that the goal achievement condition is not achieved.

Because of this, the player can be motivated to achieve the goal achievement condition. As a result, the player can be provided with diverse raising experiences. Although the raising game is ended when the goal achievement condition is not achieved in this embodiment, it is also acceptable to continue the raising game by sacrificing a reward to the player, such as not changing a parameter associated with the raising game medium, or by providing a lower reward or a smaller number of rewards than when the goal achievement condition is achieved.

(6) The display control unit 25*a* displays, on the display device 13, an indication for accepting selection of at least one first game in the case where the raising command choice related to execution of the first game is selected and displays, on the display device 13, in the turn associated with the goal achievement condition, only the first game associated with said goal achievement condition as a first game that can be selected by the player.

This prevents the raising game from ending as a result of the player selecting, in a turn associated with a goal achievement condition, a first game not related to the goal achievement condition.

(7) The electronic device 10 has the goal-achievement-condition determination unit 257 for determining, on the basis of a predetermined condition in a predetermined turn during the raising game, the goal achievement condition associated with a turn after said predetermined turn.

Because of this, an unexpected goal achievement condition is set, thereby preventing raising strategies from being uniform. Therefore, the player can be given an opportunity to conceive of diverse raising strategies. As a result, the player can be provided with diverse raising experiences.

(8) The goal-achievement-condition determination unit 257 changes, in the predetermined turn, the next predetermined goal achievement condition to another goal achievement condition on the basis of the player's selection of the first game associated with the goal achievement condition or a predetermined parameter value associated with the raising game medium.

Because of this, the player can be given an opportunity to be accidentally prompted to change the raising strategy. As a result, the player can be provided with diverse raising experiences.

(9) The goal-achievement-condition determination unit 257 determines, in the predetermined turn, the next goal achievement condition associated with a turn after said predetermined turn by a lottery process.

Because of this, the next goal achievement condition is determined accidentally. Therefore, the player can be given an opportunity to be prompted to change the raising strategy the player has had in his/her mind so far and thus can be provided with nonuniform, diverse raising experiences.

(10) The parameter associated with the player includes at least either a parameter indicating an upper limit of the turns or a parameter associated with the raising game medium.

Because of this, the player can be motivated to achieve the goal achievement condition. As a result, the player can be provided with diverse raising experiences.

(11) The first-game execution unit 251 increases the parameter indicating the upper limit of the turns in the case where the goal-achievement-condition decision unit 256 decides that the goal achievement condition has been achieved.

Because of this, the raising game can be continued, and hence, the player can be motivated to achieve the goal achievement condition. As a result, the player can be provided with diverse raising experiences.

(12) The increase in the parameter indicating the upper limit of the turns includes the difference between the turn associated with the achieved goal achievement condition and a turn that is associated with the goal achievement condition and that comes after said turn associated with the achieved goal achievement condition.

Because of this, the player can enjoy the raising game by formulating a raising strategy at least until the turn associated with the next goal achievement condition.

{Embodiment Realized by System}

Figure 18:
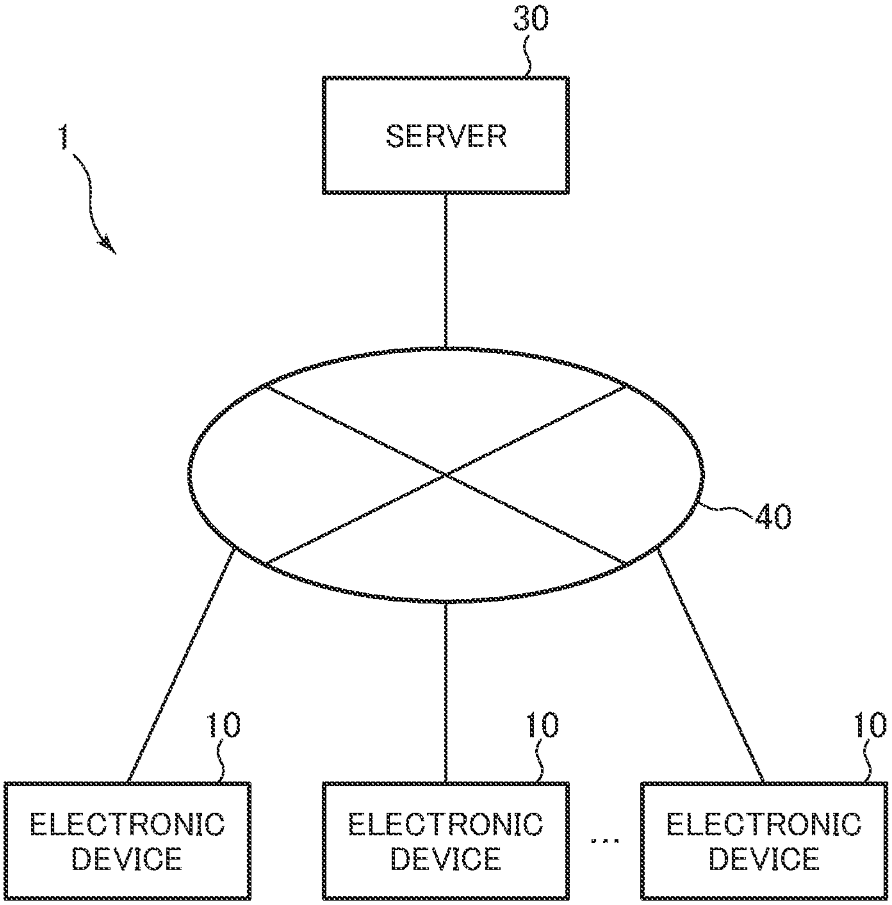
FIG. 18 is a diagram showing an example of the overall structure of the game system according to an embodiment of the present invention.

FIG. 18 is a diagram showing an example of the overall structure of the game system according to an embodiment of the present invention. A shown in FIG. 18, a game system 1 includes a plurality of the electronic devices 10 and a server 30. The electronic devices 10 are user terminals used by respective players. The electronic devices 10 and the server 30 are connected to the network 40, such as the Internet, so as to be capable of communicating with one another. Note that although the game system 1 in this embodiment is described by way of example of a server-client system, the game system 1 can be realized by a system not including the server 30, such as a P-to-P system.

It is assumed that each of the electronic devices 10 includes the same hardware configuration as that shown in FIG. 1 and is also realized by a smartphone in this embodiment. The server 30 is a server device for providing a game executable in the electronic device 10 and is constituted of at least one computer.

The server 30 stores various programs, such as a control program for controlling the progress of an online game, and various types of data used in the game.

In an example, the server 30 is configured to be capable of providing the electronic device 10 with a game application executable in the electronic device 10. After executing a downloaded game application, the electronic device 10 proceeds with the game by transmitting/receiving data to/from the server 30 periodically or as needed. For example, the server 30 stores various items of setting information necessary for a game executed in the electronic device 10, history information, etc. In this case, the electronic device 10 has functions of the input unit 21, display unit 22, storage unit 23, communication unit 24, game control unit 25, and each of the functional units of the game control unit 25.

In an example, the server 30 is a web server and provides the electronic device 10 with a game service. The electronic device 10 acquires, from the server 30, HTML data for displaying a web page, analyzes the acquired HTML data, and displays the web page. In this case, the server 30 communicating with the electronic device 10 has some of the functions of the game control unit 25. For example, the electronic device 10 accepts selection of a raising game medium and a raising command choice made by the player via the input unit 21 (input device 12), executes the raising game by means of the raising-game execution unit 25*b* of the server 30, and displays a result of the execution on the display device 13 of the electronic device 10 by means of the display control unit 25*a* of the electronic device 10.

Other Embodiments

Another embodiment of the present invention may be a program for realizing the functions or the information processing shown in the flowchart in the above-described embodiment of the present invention, or a computer-readable storage medium storing the program. Furthermore, another embodiment of the present invention may be a method for realizing the functions or the information processing shown in the flowchart in the above-described embodiment of the present invention. Furthermore, another embodiment of the present invention may be a server that is capable of providing a computer with a program for realizing the functions or the information processing shown in the flowchart in the above-described embodiment of the present invention. Furthermore, another embodiment of the present invention may be a virtual machine for realizing the functions or the information processing shown in the flowchart in the above-described embodiment of the present invention.

The processing or operation described above may be modified freely as long as no inconsistency arises in the processing or operation, such as an inconsistency that a certain step utilizes data that may not yet be available in that step. Furthermore, the examples described above are examples for explaining the present invention, and the present invention is not limited to those examples. The present invention can be embodied in various forms as long as there is no departure from the gist thereof.

REFERENCE SIGNS LIST

1 Game system
10 Electronic device
11 Processor
12 Input device
13 Display device
14 Storage device
15 Communication device
16 Bus
21 Input unit
22 Display unit
23 Storage unit
24 Communication unit
25 Game control unit
25*a* Display control unit
25*b* Raising-game execution unit
251 First-process execution unit

252 Second-process execution unit
253 Third-process execution unit
254 Fourth-process execution unit
255 Fifth-process execution unit
256 Goal-achievement-condition decision unit
257 Goal-achievement-condition determination unit
30 Server
40 Network
G1 Raising-game-medium selection screen
G2 Raising-command-choice selection screen
G3 Goal-achievement-condition detailed screen
G4 Training command selection screen
G5 Target-race determination event screen

The invention claimed is:

1. A non-transitory computer readable medium storing a program configured to perform a method, wherein the method comprises:

displaying, on a display device in an electronic device and in a first turn of executing a raising game, a raising-command-choice selection screen, wherein the electronic device comprises a processor, the display device, and an input device, wherein the raising-command-choice selection screen accepts a selection made by a player from a plurality of raising-related raising command choices using the input device, and wherein the plurality of raising-related raising command choices comprise a raising command choice related to execution of a first common game among a plurality of games that are common among a plurality of game media; and executing, by the electronic device, the raising game based on the raising command choice selected by the player in the first turn, changing a parameter associated with a raising game medium and in response to advancing the first turn during execution of the raising game by the electronic device, wherein displaying the raising-command-choice selection screen comprises displaying on the display device a goal achievement condition among a plurality of goal achievement conditions for the raising game medium in order to assist the player in selecting the raising command choice, wherein the goal achievement condition is associated with the plurality of game media, and wherein the plurality of goal achievement conditions are different for each of the plurality of game media, wherein executing the raising game comprises executing the first common game in response to selecting the raising command choice being related to the first common game, determining, based on a result of executing the first common game, whether or not the goal achievement condition has been achieved in response to the first common game and the goal achievement condition being associated, wherein executing the first common game comprises changing a parameter associated with the player based on a result of determining whether the goal achievement condition has been achieved.

2. The non-transitory computer readable medium according to claim 1, wherein the display device displays, in a certain turn not associated with the goal achievement condition, a next goal achievement condition associated with an earliest turn of at least one turn that comes after said certain turn and that is associated with the goal achievement condition.

3. The non-transitory computer readable medium according to claim 1, wherein the display device displays, in a certain turn not associated with the goal achievement condition, a remaining number of turns until a turn associated with a next goal achievement condition, said remaining number being a difference between the certain turn and an earliest turn of at least one turn that comes after the certain turn and that is associated with the goal achievement condition.

4. The non-transitory computer readable medium according to claim 1, wherein the display device displays, in a turn not associated with the goal achievement condition, a prerequisite for allowing the execution of a second common game associated with a next goal achievement condition.

5. The non-transitory computer readable medium according to claim 1, wherein the method further comprises:

advancing the raising game to a next turn as a reward for achievement of the goal achievement condition in response to determining that the goal achievement condition has been achieved, and executing a process for ending the raising game in response to determining that the goal achievement condition has not been achieved.

6. The non-transitory computer readable medium according to claim 5, wherein the display device displays an indication for accepting selection of at least one first game among the plurality of games in response to selecting the raising command choice related to execution of the first common game, wherein the display device displays, in the first turn associated with the goal achievement condition, only the first common game associated with said goal achievement condition as a game that can be selected by the player.

7. The non-transitory computer readable medium according to claim 1, wherein the method further comprises:

determining, based on a predetermined condition in a second turn during the raising game, that the goal achievement condition is associated with a third turn after said second turn.

8. The non-transitory computer readable medium according to claim 7, wherein the method further comprises changing, in the second turn, a next goal achievement condition to another goal achievement condition based on selecting the first common game associated with the goal achievement condition or a predetermined parameter value associated with the raising game medium.

9. The non-transitory computer readable medium according to claim 7, wherein the method further comprises determining, in the second turn, a next goal achievement condition associated with a fourth turn after said second turn by a lottery process.

10. The non-transitory computer readable medium according to claim 1, wherein the parameter associated with the player includes at least either a parameter indicating an upper limit of a plurality of turns or a parameter associated with the raising game medium.

11. The non-transitory computer readable medium according to claim 1, wherein the method further comprises increasing a parameter indicating an upper limit of a plurality of turns in response to determining that the goal achievement condition has been achieved.

12. The non-transitory computer readable medium according to claim 11, wherein the increase in the parameter indicating the upper limit of the plurality of turns includes a difference between a turn associated with an achieved goal achievement condition and a turn that is associated with the goal achievement condition and that comes after said turn associated with the achieved goal achievement condition.

13. An electronic device comprising:

a display device;

an input device;

a processor; and a memory configured to perform a method when executed by the processor, the method comprising:

displaying, on the display device and in a turn of executing a raising game, a raising-command-choice selection screen, wherein the raising-command-choice selection screen accepts a selection made by a player from a plurality of raising-related raising command choices using the input device, and wherein the plurality of raising-related raising command choices comprise a raising command choice related to execution of a first common game among a plurality of games that are common among a plurality of game media; and executing the raising game based on the raising command choice selected by the player in the turn, changing a parameter associated with a raising game medium and in response to advancing the turn during execution of the raising game, wherein displaying the raising-command-choice selection screen comprises displaying on the display device a goal achievement condition among a plurality of goal achievement conditions for the raising game medium in order to assist the player in selecting the raising command choice, wherein the goal achievement condition is associated with the plurality of game media, and wherein the plurality of goal achievement conditions are different for each of the plurality of game media, wherein executing the raising game comprises executing the first common game in response to selecting the raising command choice being related to the first common game, determining, based on a result of executing the first common game, whether or not the goal achievement condition has been achieved in response to the first common game and the goal achievement condition being associated, wherein executing the first common game comprises changing a parameter associated with the player based on a result of determining whether the goal achievement condition has been achieved.

14. A method comprising:

displaying, on a display device in an electronic device and in a turn of executing a raising game, a raising-command-choice selection screen, wherein the electronic device comprises a processor, the display device, and an input device, wherein the raising-command-choice selection screen accepts a selection made by a player from a plurality of raising-related raising command choices using the input device, and wherein the plurality of raising-related raising command choices comprise raising command choice related to execution of a first common game among a plurality of games that are common among a plurality of game media; and executing, by the electronic device, the raising game based on the raising command choice selected by the player in the turn, changing a parameter associated with a raising game medium and in response to advancing the turn during execution of the raising game by the electronic device, wherein displaying the raising-command-choice selection screen comprises displaying on the display device a goal achievement condition among a plurality of goal achievement conditions for the raising game medium in order to assist the player in selecting the raising command choice, wherein the goal achievement condition is associated with the plurality of game media, and wherein the plurality of goal achievement conditions are different for each of the plurality of game media, wherein executing the raising game comprises executing the first common game in response to selecting the raising command choice being related to the first common game, determining based on a result of executing the first common game, whether or not the goal achievement condition has been achieved in response to the first common game and the goal achievement condition being associated, wherein executing the first common game comprises changing a parameter associated with the player based on a result of determining whether the goal achievement condition has been achieved.

15. A game system comprising:

an electronic device; and a server connected to the electronic device via a network, wherein the electronic device is configured to perform a first method comprising:

displaying, on a display device in the electronic device and in a turn of executing a raising game, a raising-command-choice selection screen, wherein the electronic device comprises a processor, the display device, and an input device, wherein the raising-command-choice selection screen accepts a selection made by a player from a plurality of raising-related raising command choices using the input device, and wherein the plurality of raising-related raising command choices comprise a raising command choice related to execution of a first common game among a plurality of games that are common among a plurality of game media; and executing, by the electronic device, the raising game based on the raising command choice selected by the player in the turn, wherein the server is configured to perform a second method comprising:

changing a parameter associated with a raising game medium and in response to advancing the turn during execution of the raising game by the electronic device, wherein displaying the raising-command-choice selection screen comprises displaying on the display device a goal achievement condition among a plurality of goal achievement conditions for the raising game medium in order to assist the player in selecting the raising command choice, wherein the goal achievement condition is associated with the plurality of game media, and wherein the plurality of goal achievement conditions are different for each of the plurality of game media, wherein executing the raising game comprises executing the first common game in response to selecting the raising command choice being related to the first common game, determining, based on a result of executing the first common game, whether or not the goal achievement condition has been achieved in response to the first common game and the goal achievement condition being associated, wherein executing the first common game comprises changing a parameter associated with the player based on a result of determining whether the goal achievement condition has been achieved.

* * * * *